(12) United States Patent
Fujishita

(10) Patent No.: US 9,076,086 B2
(45) Date of Patent: Jul. 7, 2015

(54) DISPLAY CONTROL APPARATUS, DISPLAY CONTROL METHOD, AND STORAGE MEDIUM STORING INSTRUCTIONS FOR DISPLAY CONTROL APPARATUS

(71) Applicant: BROTHER KOGYO KABUSHIKI KAISHA, Nagoya-shi, Aichi-ken (JP)

(72) Inventor: Masahiro Fujishita, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 8 days.

(21) Appl. No.: 13/954,166

(22) Filed: Jul. 30, 2013

(65) Prior Publication Data

US 2014/0036291 A1    Feb. 6, 2014

(30) Foreign Application Priority Data

Jul. 31, 2012    (JP) ................. 2012-170234

(51) Int. Cl.
*G06K 15/00* (2006.01)
*G03G 15/00* (2006.01)
*G06F 3/048* (2013.01)

(52) U.S. Cl.
CPC ............ *G06K 15/005* (2013.01); *G03G 15/502* (2013.01); *G06F 3/048* (2013.01)

(58) Field of Classification Search
None
See application file for complete search history.

(56) References Cited

U.S. PATENT DOCUMENTS

| | | | | |
|---|---|---|---|---|
| 7,924,444 B2 * | 4/2011 | Takahashi | ............... | 358/1.13 |
| 8,707,207 B2 * | 4/2014 | Harada et al. | ................ | 715/810 |
| 2006/0279775 A1 * | 12/2006 | Matsumoto et al. | ......... | 358/1.15 |
| 2007/0013932 A1 * | 1/2007 | Genda | ............... | 358/1.13 |
| 2008/0030523 A1 * | 2/2008 | Takami et al. | ............... | 345/619 |
| 2008/0144087 A1 * | 6/2008 | Mitsui | ............... | 358/1.15 |
| 2008/0209449 A1 * | 8/2008 | Maehira | ............... | 719/321 |
| 2008/0244439 A1 * | 10/2008 | Oguri et al. | ............... | 715/772 |
| 2008/0294983 A1 * | 11/2008 | Hoshino et al. | ............... | 715/273 |
| 2009/0059279 A1 * | 3/2009 | Sakurai | ............... | 358/1.15 |
| 2009/0201540 A1 * | 8/2009 | Morooka | ............... | 358/1.15 |
| 2009/0228822 A1 * | 9/2009 | Miyata | ............... | 715/771 |
| 2009/0316180 A1 * | 12/2009 | Nakagawa | ............... | 358/1.14 |
| 2010/0033759 A1 * | 2/2010 | Motokado et al. | ............... | 358/1.15 |
| 2010/0085599 A1 * | 4/2010 | Nomura | ............... | 358/1.15 |
| 2010/0097422 A1 * | 4/2010 | Tamaoki | ............... | 347/14 |
| 2010/0115464 A1 * | 5/2010 | Harada et al. | ............... | 715/810 |
| 2010/0214571 A1 * | 8/2010 | Luo | ............... | 358/1.1 |

(Continued)

FOREIGN PATENT DOCUMENTS

| | | |
|---|---|---|
| JP | 2006-163954 A | 6/2006 |
| JP | 2011-34515 A | 2/2011 |
| JP | 2011034515 A  * | 2/2011 |

*Primary Examiner* — King Poon
*Assistant Examiner* — Ted Barnes
(74) *Attorney, Agent, or Firm* — Merchant & Gould PC

(57) ABSTRACT

A display control apparatus includes a control section which controls a display to display contents in a first display area, a second display area, and a third display area on the display. The control section is configured to: display at least one setting value in the first display area for each of a plurality of setting items; allow a user to select one of the at least one setting value in a particular setting item; receive a user's selection of the setting value for each of the setting items; display the selected setting value in the second display area in receipt of the user's selection; determine whether there is an exclusive setting value in the setting values displayed in the first display area and belonging to any setting item other than the particular setting item, the exclusive setting value being inadequate to be selected with the selected setting value.

6 Claims, 19 Drawing Sheets

(56) References Cited

U.S. PATENT DOCUMENTS

| | | | |
|---|---|---|---|
| 2010/0333009 A1* | 12/2010 | Oshita et al. | 715/771 |
| 2011/0138274 A1* | 6/2011 | Hoshino et al. | 715/273 |
| 2012/0013948 A1* | 1/2012 | Morooka | 358/1.15 |
| 2012/0200882 A1* | 8/2012 | Ito | 358/1.15 |
| 2012/0206762 A1* | 8/2012 | Minagawa | 358/1.15 |
| 2012/0224198 A1* | 9/2012 | Kawabata et al. | 358/1.9 |
| 2012/0224218 A1* | 9/2012 | Ito | 358/1.15 |
| 2012/0250061 A1* | 10/2012 | Takami et al. | 358/1.13 |
| 2012/0268753 A1* | 10/2012 | Tokuda | 358/1.2 |

* cited by examiner

Fig. 2A

< INITIAL SCREEN >

| SCAN SETTING | | | |
|---|---|---|---|
| SELECTABLE ITEM 41 | | SELECTED ITEM 42 | NON-SELECTABLE ITEM 43 |
| COLOR TYPE<br>[MONOCHROME] [GRAY] [COLOR]<br>RESOLUTION<br>[100dpi] [200dpi] [300dpi] [600dpi] [1200dpi]<br>DOCUMENT SIZE<br>[LEGAL] [LETTER] [A4] [B5] [BUSINESS CARD]<br>DOUBLE-SIDED SCANNING<br>[DOUBLE-SIDED SCANNING ON]<br>DOCUMENT-SIZE IDENTIFICATION<br>[DOCUMENT-SIZE IDENTIFICATION ON]<br>PAPER FEEDING METHOD<br>[FB] [ADF] [AUTO] | | [MONOCHROME]<br><br>[200dpi]<br><br>[A4]<br><br><br><br><br>[AUTO] | ☒<br><br><br><br><br><br><br><br><br><br>[OK] |

Fig. 2B

<EXCLUSIVE-RELATIONSHIP TABLE>

| SETTING ITEM | ITEM | | EXCLUSIVE SETTING ITEM | EXCLUSIVE ITEM |
|---|---|---|---|---|
| COLOR TYPE | COLOR | ⇔ | RESOLUTION | 1200 dpi |
| DOUBLE-SIDED SCANNING | ON | ⇔ | DOCUMENT-SIZE IDENTIFICATION | DOCUMENT-SIZE IDENTIFICATION ON |
| | | | PAPER FEEDING METHOD | FB |
| DOCUMENT-SIZE IDENTIFICATION | ON | ⇔ | DOUBLE-SIDED SCANNING | DOUBLE-SIDED SCANNING ON |
| | | | PAPER FEEDING METHOD | ADF |
| PAPER FEEDING METHOD | FB | ⇔ | DOUBLE-SIDED SCANNING | DOUBLE-SIDED SCANNING ON |
| PAPER FEEDING METHOD | ADF | ⇔ | DOCUMENT-SIZE IDENTIFICATION | DOCUMENT-SIZE IDENTIFICATION ON |

Fig. 2C

⟨ INITIAL DISPLAY AREA PRESETTING TABLE⟩

| SETTING ITEM | ITEM | INITIAL DISPLAY AREA |
|---|---|---|
| COLOR TYPE | MONOCHROME | SECOND AREA (SELECTED ITEM) |
| | GRAY | FIRST AREA (SELECTABLE ITEM) |
| | COLOR | FIRST AREA (SELECTABLE ITEM) |
| RESOLUTION | 100 dpi | FIRST AREA (SELECTABLE ITEM) |
| | 200 dpi | SECOND AREA (SELECTED ITEM) |
| | 300 dpi | FIRST AREA (SELECTABLE ITEM) |
| | 600 dpi | FIRST AREA (SELECTABLE ITEM) |
| | 1200 dpi | FIRST AREA (SELECTABLE ITEM) |
| ---- | ---- | ---- |

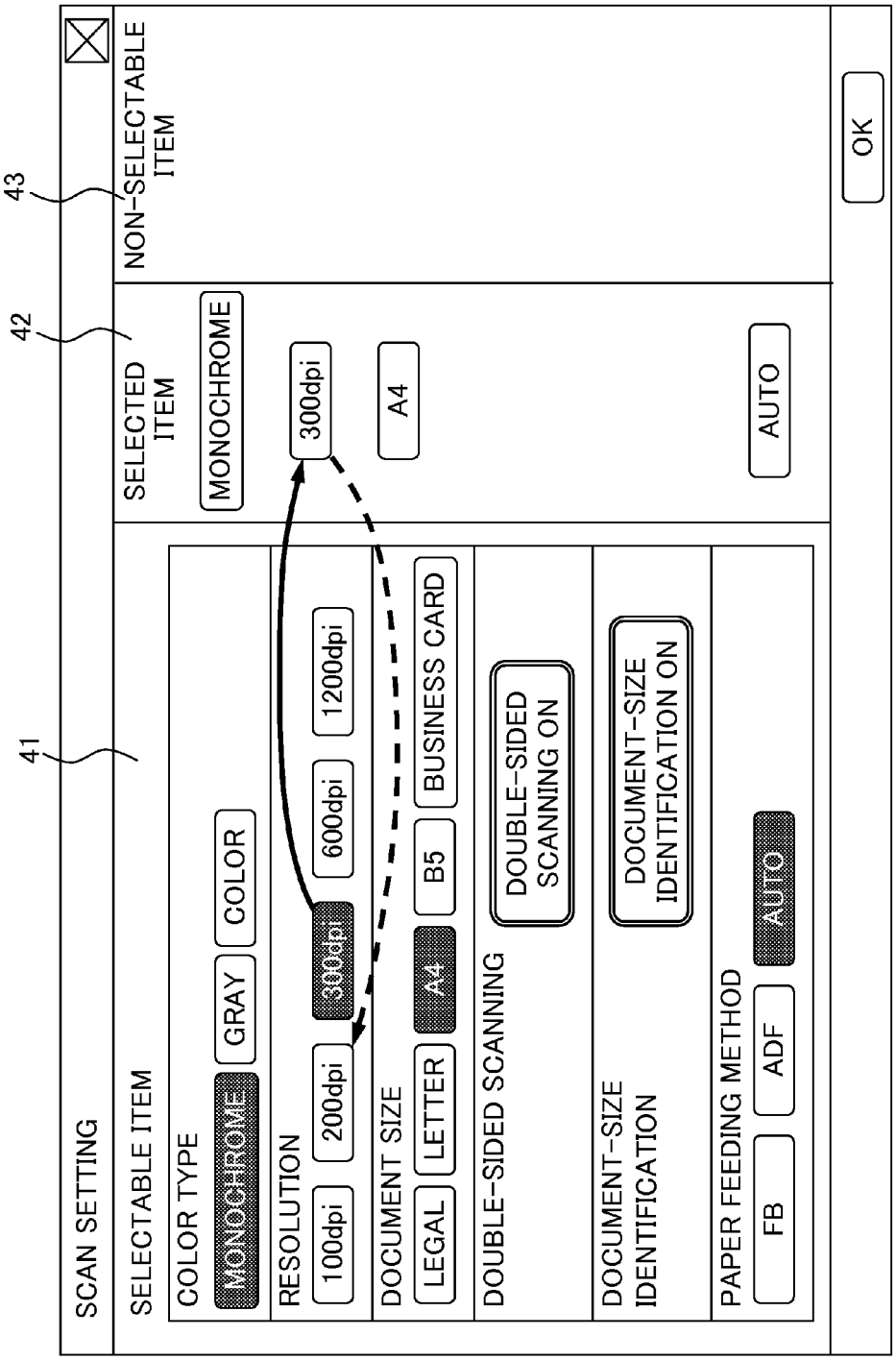

ITEM-SHIFT EXAMPLE 2 (WITH EXCLUSIVE RELATIONSHIP)

Fig. 4A
ITEM-SHIFT EXAMPLE 3(OPERATION OF RETURNING EXCLUSIVE ITEMS)

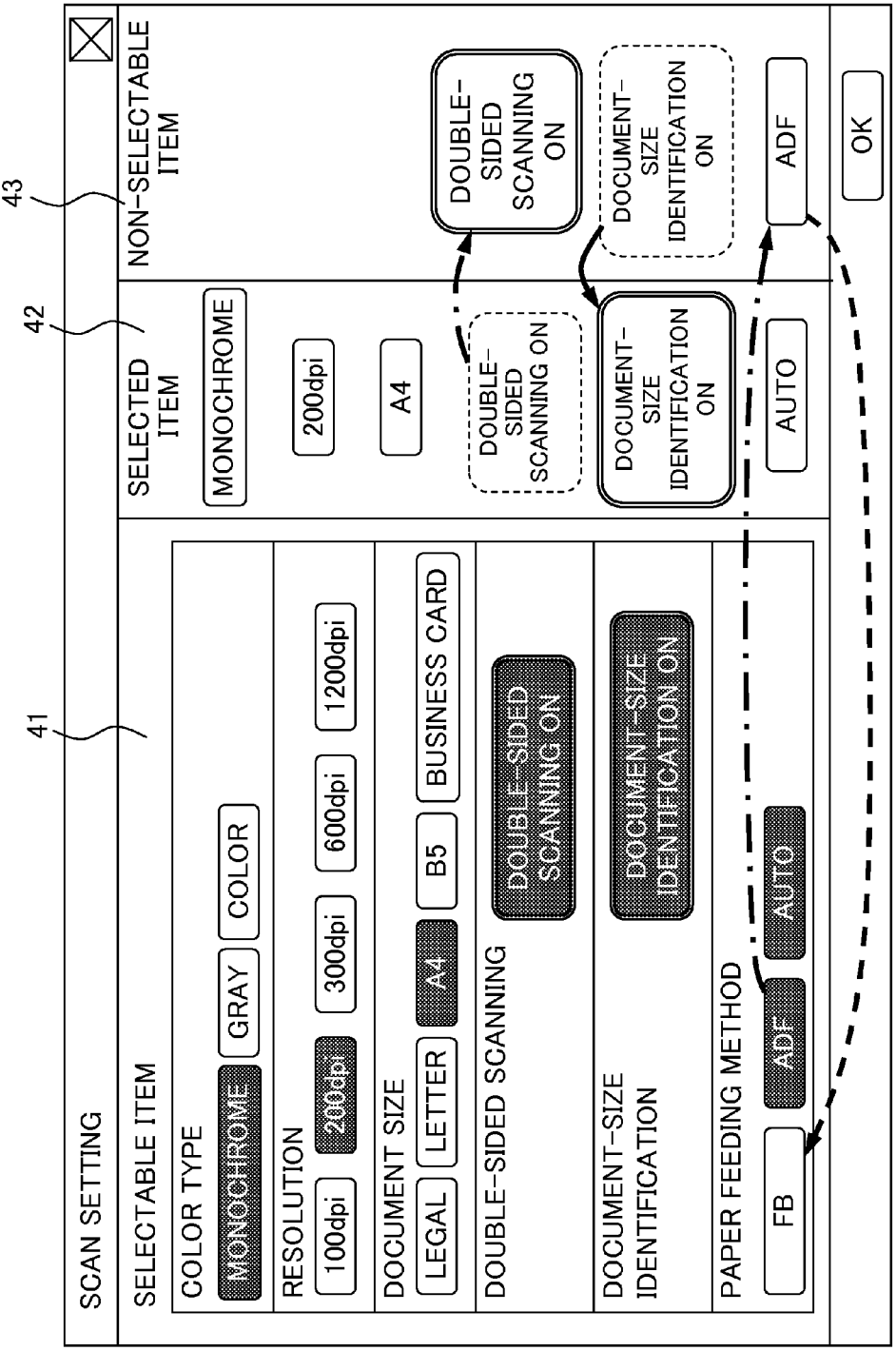

<SETTING-SCREEN DISPLAY PROCESSING>

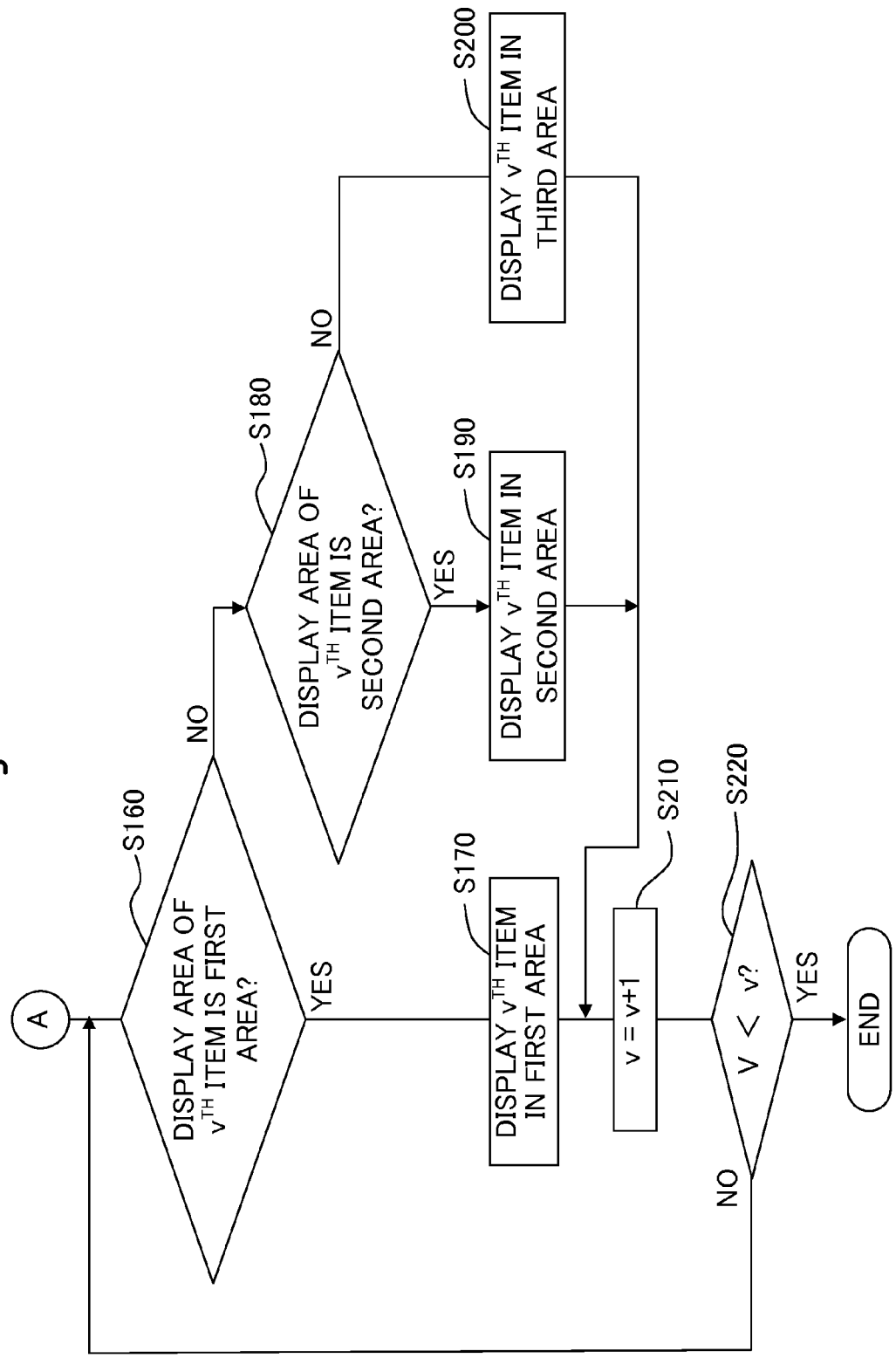

DISPLAY CONTROL APPARATUS, DISPLAY CONTROL METHOD, AND STORAGE MEDIUM STORING INSTRUCTIONS FOR DISPLAY CONTROL APPARATUS

CROSS REFERENCE TO RELATED APPLICATION

The present application claims priority from Japanese Patent Application No. 2012-170234, filed on Jul. 31, 2012, the disclosure of which is incorporated herein by reference in its entirety.

BACKGROUND OF THE INVENTION

1. Field of the Invention

The present invention relates to a display control apparatus configured to control a display of a setting value for each of a plurality of types of setting items, a display control method, and a storage medium storing instructions for the display control apparatus.

2. Description of the Related Art

An information processing device such as a personal computer (hereinafter, referred to as "PC"), and various types of peripheral devices such as a printer and a scanner which are used upon being connected to the PC (or used alone) include, in general, a user interface for allowing a user to view setting contents (setting values), and for receiving an operation such as selection and change of each of the setting values, with respect to a plurality of types of setting items to be used for realizing various functions. For instance, in a scanner, by displaying a setting screen for displaying various setting items (such as a resolution, a document size, and a color type) necessary for reading a document on a display section, the user is capable of knowing a current setting state. Moreover, by carrying out a predetermined operation in a state that the setting screen is displayed, the user is able to select and change the setting values of each setting item appropriately, and make the scanner carry out scanning With a high functionality of various devices in recent years, setting items which can be set in one function or application tend to increase. As the setting items which can be set increase, it is possible to provide a wide variety of functions and services to the user. However, at the same time, a user interface becomes complicated, and operability and usability are degraded.

In view of this, in Japanese Patent Application Laid-open No. 2011-34515, a technology that improves the operability of a process from selection of the setting items up to parameter determination has been disclosed. Concretely, the setting screen is formed to be divided into a setting-item display area, a selection area, and a determination area. As the user shifts (drags and drops) one of the plurality of types of setting items displayed in the setting-item display area to the selection area, all parameters which can be set for the setting item are displayed in the selection area. As a desired parameter among all the parameters displayed in the selection area is shifted to the determination area, the parameter of the setting item is determined.

SUMMARY OF THE INVENTION

However, in a case that an arrangement is made such that each of the setting values of the plurality of setting items can be selected, the values of the setting items may be mutually exclusive and cannot be selected simultaneously due to a mechanical constraint or a hardware constraint. For instance, in a scanner, in a case that double-sided scanning of a document is selected to be effective, a flatbed setting cannot be selected as a paper feeding method. In other words, the double-sided scanning and the flatbed setting are mutually exclusive, are in conflict with each other, and hence cannot be set at the same time.

In a case that there is an exclusive setting value which is exclusive to a setting value selected by the user and which belongs to a setting item different from a setting item to which the setting value selected by the user belongs, if the presence of the exclusive setting value is not specified clearly by some sort of technique, it is difficult to understand as to what value can be selected and what value cannot be selected, and there is a possibility that the usability for the user in selecting the setting value is degraded. Therefore, in a case that there is the exclusive setting value which is exclusive to the setting value selected by the user, it is desired that the user is able to know the presence of the exclusive value easily and specifically.

The present invention has been made in view of the abovementioned issues, and an object of the present invention is to improve the usability for the user at the time of selecting the setting value by arranging such that the user can aware easily and specifically of the exclusive setting value which is exclusive to the setting value selected by the user and which belongs to a setting item different from a setting item to which the setting value selected by the user belongs.

According to an aspect of the present invention, these is provided a display control apparatus configured to control a display to display contents in a first display area, a second display area, and a third display area on the display, the display control apparatus including: a control section for controlling the display configured to: display at least one setting value in the first display area for each of a plurality of setting items; allow a user to select one of the at least one setting value, displayed in the first display area, in a particular setting item; receive a user's selection of the one of the at least one setting value as an effective setting value for each of the plurality of setting items; display the selected setting value in the second display area in receipt of the user's selection; determine whether there is an exclusive setting value in the setting values, that are displayed in the first display area and belong to any setting item other than the particular setting item, the exclusive setting value being inadequate to be selected with the selected setting value; and display the exclusive setting value in the third display area as a non-selectable setting value when determined that there is the exclusive setting value.

According to the display control apparatus of the present invention configured in such manner, in a case that the user has carried out an operation of selecting a desired setting value from the first display area, the setting value which has been selected is not only displayed in the second display area, but the exclusive setting value which is exclusive to the setting value selected by the user is displayed in the third display area. Therefore, the user is able to know easily and specifically that there is the exclusive setting value which belongs to a setting item different from a setting item to which the setting value selected by the user belongs. Accordingly, it is possible to improve usability for the user at the time of selecting the setting value.

In the present invention, "displaying" a "setting value" not only means to display the setting value, but also includes displaying various types of information expressing the setting value directly or indirectly, such as displaying an image of a symbol or an icon indicating the setting value for example.

Moreover, it is possible to realize each processing executed by the control section of the abovementioned display control apparatus of the present invention as instructions which cause a computer to execute each processing, and as a storage medium storing such instructions.

BRIEF DESCRIPTION OF THE DRAWINGS

FIG. 2A is a diagram showing an example of an initial-screen of a scan setting screen, FIG. 2B is an example of an exclusive-relationship table, and FIG. 2C is an example of an initial display area presetting table.

FIG. 3A is a diagram showing an item-shift example 1 on the scan setting screen.

FIG. 4A is a diagram showing an item-shift example 3 on the scan setting screen, and FIG. 4B is a diagram showing an item-shift example 4 on the scan setting screen.

FIGS. 5A and 5B show a flowchart depicting a setting-screen display processing executed by a CPU of a PC.

DETAILED DESCRIPTION OF THE PREFERRED EMBODIMENTS

Figure 1:
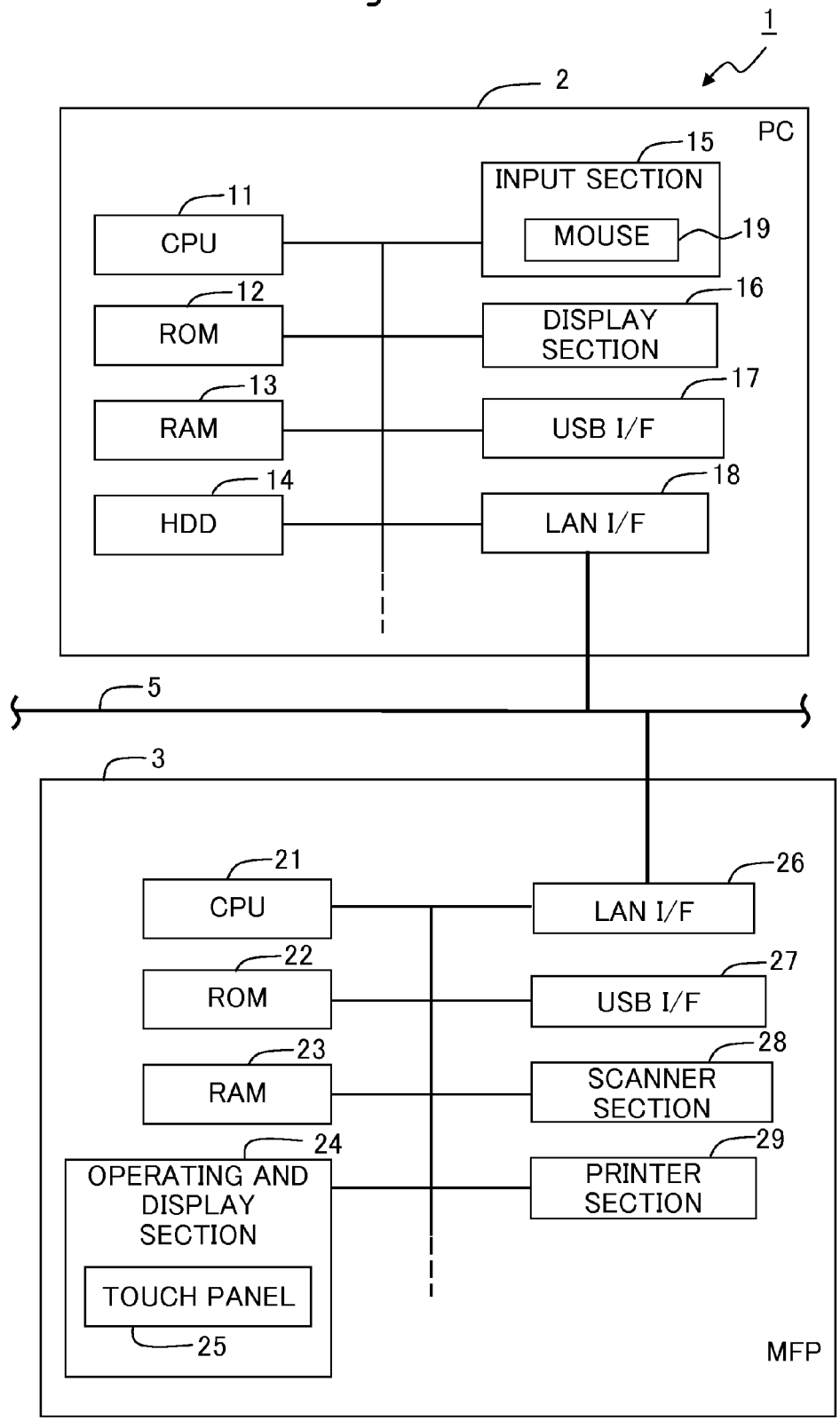
FIG. 1 is a block diagram showing a schematic configuration of an information processing system according to an embodiment.

An exemplary embodiment of the present invention will be described below by referring to the accompanying diagrams. An information processing system 1 according to the embodiment, as shown in FIG. 1, is a system formed by a PC (Personal Computer) 2 and an MFP (Multi-Function Peripheral) 3 which are communicably connected each other via a network 5. The MFP 3 is a so-called multifunction device which includes various functions such as a scanner function of scanning an image of a document and a printer function of printing an image on a recording medium such as a recording paper and an OHP (Over Head Projector) sheet.

The PC 2 as a display control apparatus has a known configuration including a CPU (Central Processing Unit) 11, a ROM (Read Only Memory) 12, a RAM (Random Access Memory) 13, a hard disc drive (HDD) 14, an input section 15, a display section 16, a USB (Universal Serial Bus) interface 17, and a LAN (Local Area Network) interface 18. The input section 15 includes a known mouse device 19 which is operated by a user, and a keyboard which is not shown in the diagram. The display section 16 is formed by a display device such as a liquid-crystal display.

Various software are installed in the HDD 14. The various software include a software (hereinafter, called as a "scanning software") which is capable of giving an instruction to read (scan) an image by controlling the scanner function of the MFP 3 while communicating with the MFP 3, and capable of processing image data scanned by and received from the MFP 3. In the scanning software, a user can set various setting items (such as color type, resolution, and document size) which are used by the MFP 3 at the time of scanning The CPU 11 which executes the scanning software is an example of a control section which controls the display section 16.

The MFP 3 includes a CPU 21, a ROM 22, a RAM 23, an operating and display section 24, a LAN interface 26, a USB interface 27, a scanner section 28, and a printer section 29. The CPU 21 executes control and computing of each section in the MFP 3 according to various computer programs and data stored in the ROM 22. The RAM 23 is used as a main memory which is directly accessible from the CPU 21. The operating and display section 24 includes a touch panel 25 and push buttons which are not shown in the diagram. The scanner section 28 includes an image sensor and generates image data corresponding to an image of a document which has been read. The printer section 29 prints an image on a recording medium.

The MFP 3 includes a flatbed on which a document is to be placed, and an automatic document feeder (hereinafter, called as an "ADF") which transports a document automatically. At the time of scanning a document, the user can select whether the document is to be placed on the flatbed, or the document is to be fed by the ADF.

Next, a setting procedure by the user at the time of setting various scanning parameters for the scanning software of the PC 2 will be described below concretely. For setting various setting items, to begin with, the user boots up the scanning software. As the user carries out a predetermined operation for invoking a scan-setting screen from a main-menu screen of the scanning software, an initial screen of the scan-setting screen as shown in FIG. 2A is displayed on the display section 16. In the embodiment, color type, resolution, document size, double-sided scanning, document-size identification, and paper feeding method are set as setting items for scanning which can be set on the scan-setting screen.

From among these items, the color type indicates a type of color (number of colors) to be scanned, and in the embodiment, one of three parameters (setting values) namely monochrome, gray, and color can be set (selected). As for the resolution, in the embodiment, one of five parameters (setting values) namely 100 dpi (dots per inch), 200 dpi, 300 dpi, 600 dpi, and 1200 dpi can be selected. Regarding the document size, in the embodiment, one of five types of parameters (setting values) namely, legal, letter, A4, B5, and business card can be selected. The paper feeding method indicates how to set a document, and in the embodiment, one of three parameters (setting values) namely "FB" (flatbed) which indicates scanning a document by placing the document on the flatbed, "ADF" which is a method of feeding the document by using the ADF, and "auto" which is a method of making the MFP 3 identify the "FB" and the "ADF" automatically, can be selected.

The double-sided scanning indicates a function of scanning two surfaces of a document automatically (hereinafter, called as "double-sided scanning"), and in the embodiment, it is possible to select whether the double-sided scanning function is effective or not. Therefore, a parameter (setting value) which can be set for the double-sided scanning is "double-sided scanning ON" which makes the double-sided scanning function effective. When the parameter "double-sided scanning ON" is selected, the double-sided scanning function becomes effective, whereas, when the parameter "double-sided scanning ON" is not selected, the double-sided scanning function becomes ineffective. The double-sided scanning function is a function which cannot be executed in a state that a document is placed on the flatbed, and can be executed in a case of feeding the document by the ADF.

The document size identification is a function of identifying automatically a size of a document that has been placed on the flatbed (hereinafter, called as a "document-size identification function"), and in the embodiment, it is possible to select whether the document-size identification function is effective or not. Therefore, a parameter (setting value) which can be set for the document-size identification is "document-size identification ON" which makes the document-size identification function effective. When the "document-size identification ON" is selected, the document-size identification functions becomes effective, whereas, when the "document-size identification ON" is not selected, the document-size identification function becomes ineffective.

The document-size identification function, more specifically, is a function of generating and saving image data upon dividing an image separately for each of a plurality of documents by one scanning operation at the time of executing scanning in a state that a plurality of documents (such as a business card and a card) are placed on the flatbed. Therefore, in a case of scanning by using the document-size identification function, it is necessary to execute upon placing the documents on the flatbed.

The scan-setting screen, as shown in FIG. 2A, has a first area 41 in which parameters of each setting item are displayed as a list for each setting item, a second area 42 in which a parameter which has been selected and set from among the parameters of the setting items is displayed, and a third area 43 in which a parameter which can not be selected at the current point of time from among the parameters of the setting items is displayed.

On the scan-setting screen, each parameter is displayed as an image in the form of a substantially rectangular-shaped icon (hereinafter, called as "item") as shown in FIG. 2A. In the following description, when a word "item" is used, it denotes not only an image in the form of an icon which has been displayed on the scan-setting screen, but also the corresponding parameter (setting value).

The user can shift a desired item (parameter) between different areas by a drag-and-drop operation using the mouse device 19. However, in the embodiment, it is possible to shift the items from the first area 41 to the second area 42, from the second area 42 to the first area 41, and from the third area 43 to the second area 42.

In the first area 41, items which can be selected by the user are displayed as a list. Basically, all the items for each of the setting items are displayed in the first area 41. However, in the embodiment, the items which have been already selected and displayed in the second area 42 and the items which have been displayed in the third area 43 as non-selectable items are displayed to be grayed-out. It is not necessary to display these items to be grayed-out in such manner in the first area 41, and it is possible to display these items in the first area 41 in a manner other than grayed-out, or an arrangement may be made not to display these items in the first area 41 at all.

An item which has already been selected and set (selected item) is displayed in the second area 42. In the initial screen shown in FIG. 2A, "monochrome", "200 dpi", "A4", and "auto" are displayed as "selected items" in the second area 42. The initial screen indicates that "monochrome" has been selected as the color type, "200 dpi" has been selected as the resolution, "A4" has been selected as the document size, "auto" has been selected as the paper feeding method, and any item has not been selected from both of the "double-sided scanning" and the "document-size identification".

In the third area 43, an item which cannot be selected is displayed. The item which cannot be selected means an item which is exclusive to the "selected item" displayed in the second area 42. In the embodiment, in principle, although it is possible for the user to select any desired item for each of the setting items, there exist some combinations of items which cannot be selected at the same time (they are mutually exclusive) among the setting items which are different from one another. The combination of the exclusive relationship is set in advance in an exclusive-relationship table shown in FIG. 2B. The exclusive-relationship table has been stored in the HDD 14 as a part of the scanning software. The exclusive-relationship table is an example of the exclusive-relationship information.

Combinations of items which are mutually exclusive are listed up in the exclusive-relationship table as shown in FIG. 2B. For instance, "color" in the color type and "1200 dpi" in the resolution are mutually exclusive and cannot be selected at the same time. In such manner, due to a software constraint or a mechanical constraint, there exist a plurality of combinations of items which are mutually exclusive, and the exclusive-relationship table (FIG. 2B) in which the combinations of items are listed up has been stored in the HDD 14 as a part of the scanning software.

In the initial screen shown in FIG. 2A, each of the "selected item" displayed in the second area 42 is an item which is not exclusive to any items. Therefore, in the initial state, there exists no non-selectable item which cannot be selected, and no non-selectable item is displayed in the third area 43.

In an initial state (default) when the scanning software is booted up and the scan setting screen is displayed in the beginning, the items are set as shown in FIG. 2A, and when an OK button is clicked in this state, scanning of a document with the setting condition is carried out. As to which item is to be displayed in which area in the initial state (in other words, as to which item is in a selection state and as to which item is in a non-selection state) has been set in advance in an initial display area presetting table shown in FIG. 2C.

The initial display area presetting table has been stored in the HDD 14 as a part of the scanning software. The initial display area presetting table defines initial display area of each parameter of each setting item from among the three areas namely, the first area 41, the second area 42, and the third area 43 on the scan setting screen. In other words, the initial display area presetting table defines items which are in the selection state in the initial state. As the user boots up the scanning software and carries out a predetermined operation for displaying the scan setting screen, the initial display area presetting table shown in FIG. 2C is referred to, and accordingly, the initial screen shown in FIG. 2A is displayed on the display section 16.

However, in the embodiment, every time the scanning software is terminated, setting contents at the time of termination (hereinafter, called as "previous setting contents") are saved in the HDD 14 as a setting file. Moreover, when the scanning software is booted once again subsequently and the initial screen is displayed, if the previous setting contents are saved as the setting file, the previous setting contents are displayed on a priority basis.

The user can also make a setting such that the previous setting contents are not saved, and can also make a setting such that the previous setting contents are ignored and default setting contents are displayed every time. To save the previous setting contents as a setting file is an example, and the previous setting contents may be saved in a registry, or may be saved upon compiling as a database, and the previous setting contents may be acquired from the database.

The user can change the setting contents of the initial screen in FIG. 2A. For instance, when the user wants to change the resolution from "200 dpi" to "300 dpi", as the user drags and drops the item "300 dpi" from the first area 41 to an arbitrary position in the second area 42, "300 dpi" is displayed at a predetermined position (a position at which "200 dpi" had been displayed) in the second area 42 as shown in FIG. 3A. With this, "200 dpi" which had been displayed in the second area 42 originally, is shifted automatically to the first area 41. Concretely, as shown in FIG. 3A, "200 dpi" is changed from a grayed-out state to a normal-display state. Accordingly, "200 dpi" can be selected.

Moreover, for instance, in the state shown in FIG. 3A, when the item "300 dpi" which has been selected currently is dragged and dropped from the second area 42 to the first area 41 (dropped at an arbitrary position in the first area 41), the item "300 dpi" is displayed normally in the first area 41. With this, in the second area 42, an item which had been selected immediately before "300 dpi", or, an item which is default-set is displayed as the resolution.

Figure 3B:
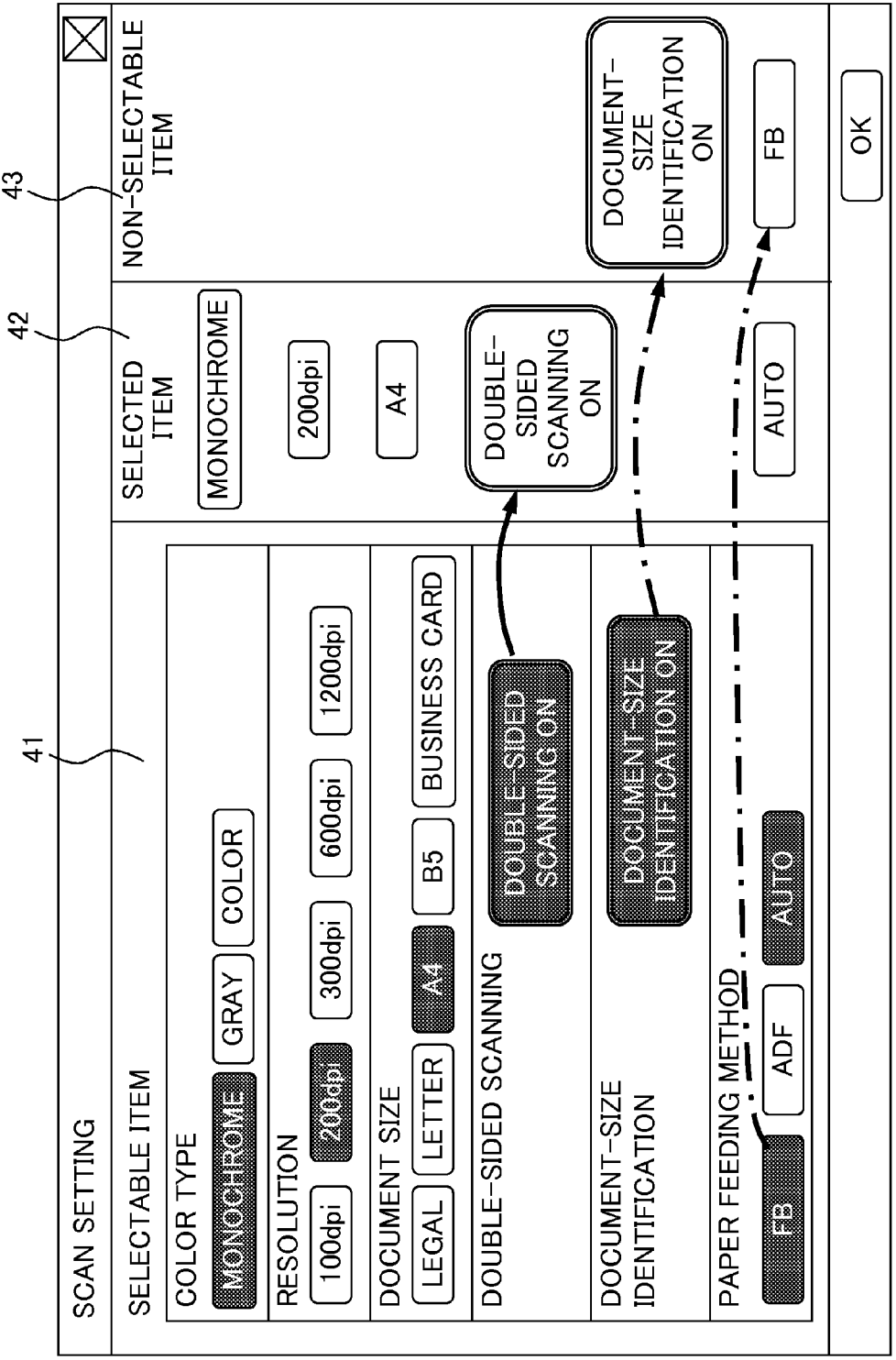
FIG. 3B is a diagram showing an item-shift example 2 on the scan setting screen.

The example in FIG. 3A is an example of shifting an item which is not exclusive to any other item, and in a case that an item which is exclusive to another item is selected, an item which is exclusive to the selected item is shifted automatically from the first area 41 to the third area 43 as a "non-selectable item". For instance, as exemplified in FIG. 3B, if the user shifts the item "double-sided scanning ON" to the second area 42 in order to make the double-sided scanning function effective, the "document-size identification ON" and the "FB" which are exclusive to the "double-sided scanning ON" are shifted automatically to the third area 43 respectively, and these items cannot be selected by the user.

In the state exemplified in FIG. 3B, as the user shifts the item "double-sided scanning ON" from the second area 42 to the first area 41 in order to make the double-sided scanning function ineffective, both the "document-size identification ON" and the "FB" which had been displayed in the third area 43 as the "non-selectable item" are shifted automatically to the first area 41, and are displayed normally once again as the "selectable item".

Figure 4A:
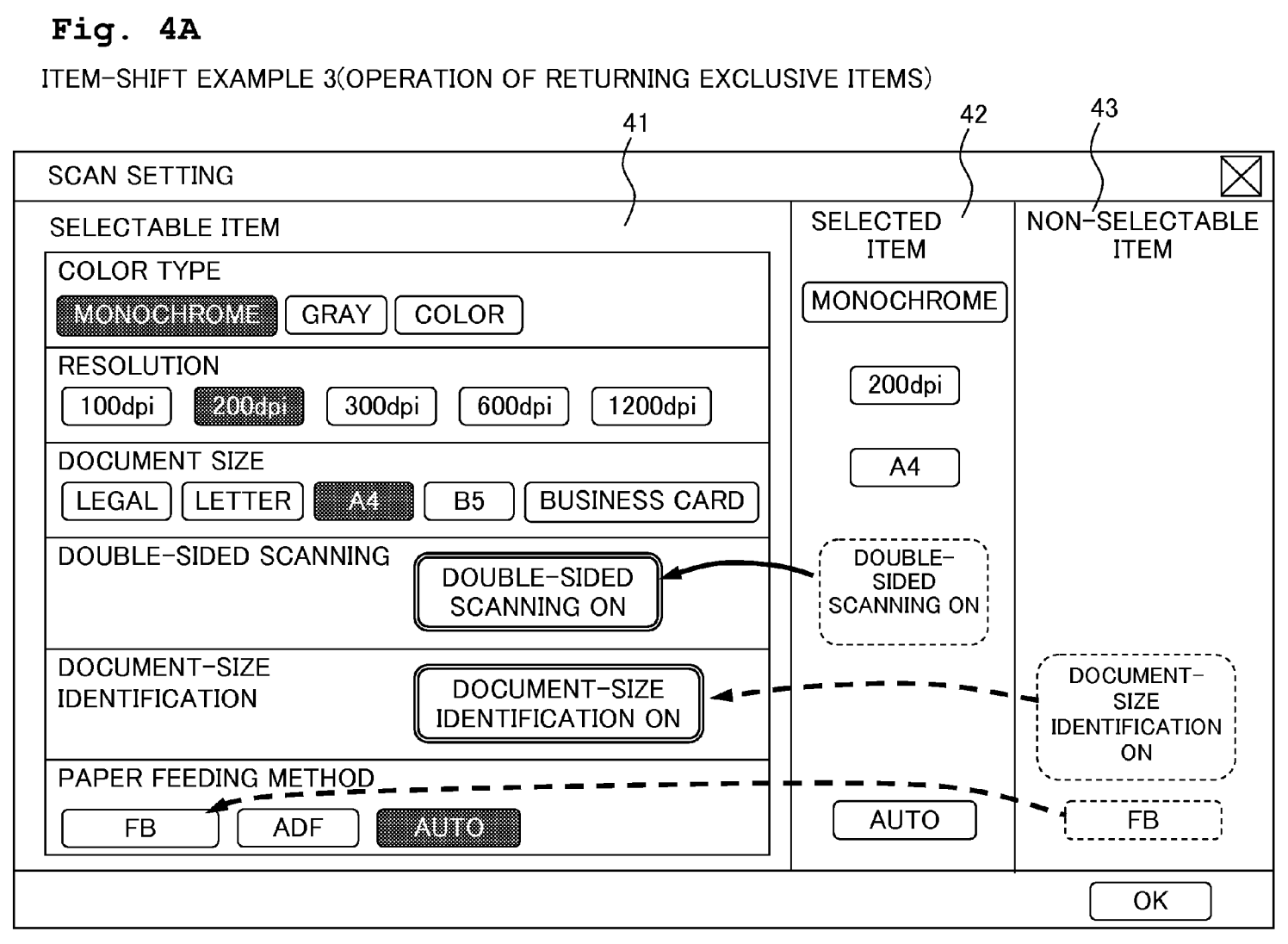

On the other hand, in the sate exemplified in FIG. 3B, in order to make the document-size identification function effective, the user can shift the item "document-size identification ON" displayed in the third area 43 to the second area 42 as exemplified in FIG. 4B. In other words, it is possible to change an item from the "non-selectable item" to the "selected item" forcibly.

However, in a case that the item "document-size identification ON" is shifted to the second area 42, since the "document-size identification ON" and the "double-sided scanning ON" are exclusive to each other, the item "double-sided scanning ON" is shifted automatically from the second area 42 to the third area 43 as the "non-selectable item". Moreover, the paper feeding method "ADF" is exclusive to the "document-size identification ON" (refer to FIG. 2B). Therefore, the item "ADF" displayed as the "selectable item" in the first area 41 is also shifted automatically to the third area 43 as the "non-selectable item".

Furthermore, as a result of shifting the item "double-sided scanning ON" from the second area 42 to the third area 43 as the "non-selectable item", the item "FB" which had been displayed in the third area 43 is shifted automatically to the first area 41, and is displayed once again as the "selectable item".

Next, in order to realize display examples and shifting examples of the abovementioned items, each processing executed by the CPU 11 of the PC 2 will be described below in detail while referring to flowcharts shown in FIG. 5A to FIG. 10B. All the flowcharts shown in FIG. 5A to FIG. 10B are saved in the HDD 14 as a part of a computer program that forms the scanning software.

Figure 5A:
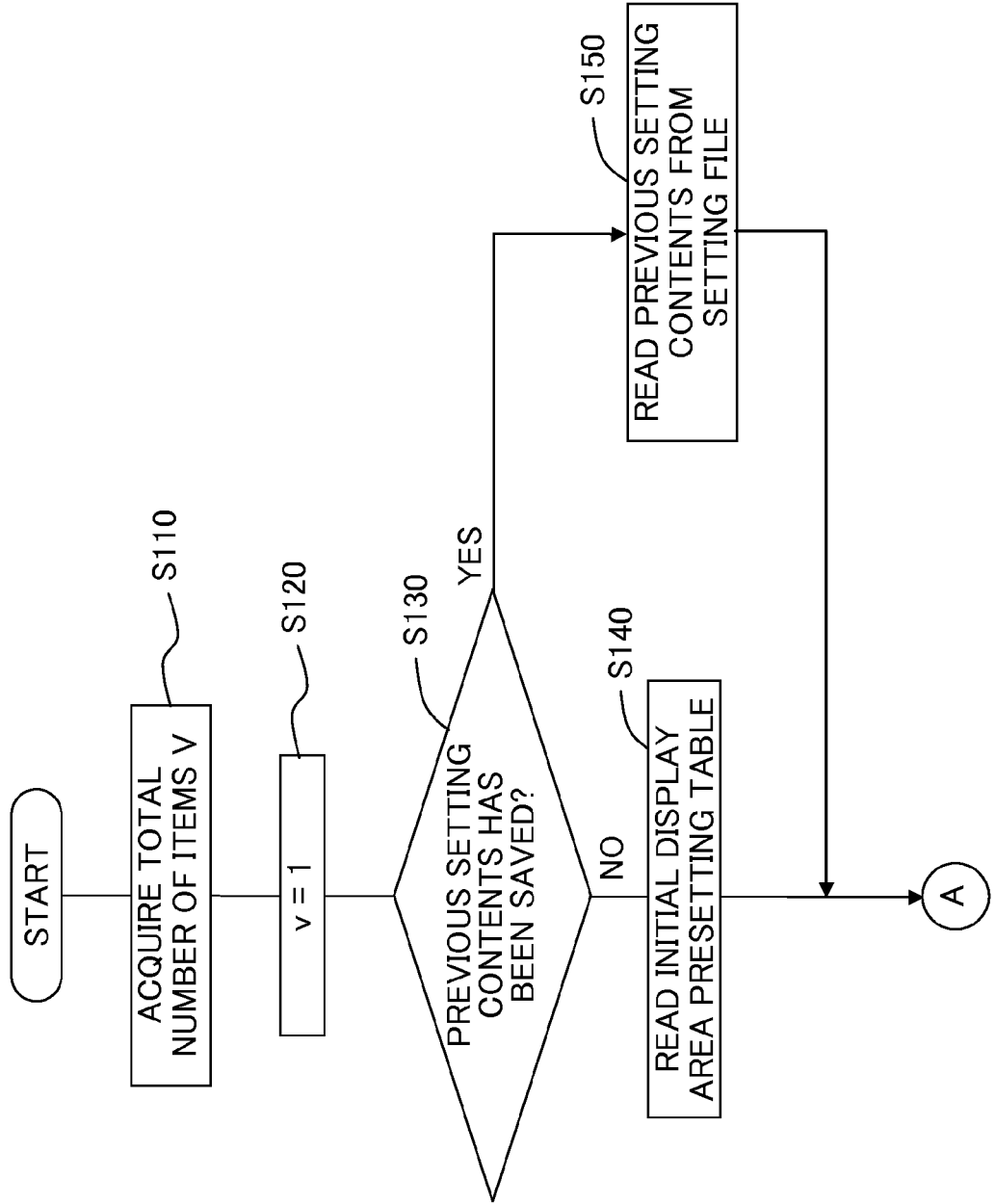

As the scanning software is booted up and a predetermined operation for calling a scan-setting screen is carried out by the user, the CPU 11 starts a setting-screen display processing as shown in FIGS. 5A and 5B. As the CPU 11 starts the setting-screen display processing in FIGS. 5A and 5B, firstly, at step S110, the CPU 11 acquires an item total-number V which is the total number of items. As the CPU 11 acquires the item total-number V, the CPU 11 sets an item number v to 1 at step S120.

At step S130, the CPU 11 judges whether or not a setting at the time of previous display has been saved. In other words, as it has already been mentioned, in the embodiment, every time the scanning software is terminated, the setting contents at the time of termination (previous setting contents) are saved in the HDD 14 as a setting file. Therefore, the CPU 11 judges whether or not the previous setting contents have been saved. In a case that the previous setting contents have not been saved, or in a case that the setting is made such that the previous setting contents are not saved (NO at step S130), the CPU 11 reads the initial display area presetting table (FIG. 2C) at step S140. Whereas, in a case that the previous setting contents have been saved (YES at step S130), the CPU reads the previous setting contents from the setting file at step S150.

At step S160, the CPU 11 judges whether or not the display area of the $v^{th}$ item is the first area 41 by using the information read at step S140 or step S150. In a case that the display area of the $v^{th}$ item is set as the first area 41 (YES at step S160), the CPU 11 displays the $v^{th}$ item at a predetermined position in the first area 41 on the scan-setting screen at step S170. Moreover, the CPU 11 increments the item number v by 1 at step S210, and the CPU 11 judges whether or not all the item number v at the current time is greater than the item total-number V at step S220. In a case that the item number v is greater than the item total-number V (YES at step S220), the CPU 11 terminates the setting-screen display processing. In a case that the item number v is not greater than the item total-number V (NO at step S220), the process returns to step S160 and the CPU continues processing.

In a case that at step S160, the display area of the $v^{th}$ item is not set as the first area 41 (NO at step S160), the process advances to step S180, and the CPU 11 judges whether or not the display area of the $v^{th}$ item is the second area 42. In a case that the display area of the $v^{th}$ item is set as the second area 42 (YES at step S180), the CPU 11 displays the $v^{th}$ item (as a selected item) at a position in the second area 42 on the scan-setting screen at step S190, and the process advances to step S210.

In a case that the display area of the $v^{th}$ item is not set as the second area 42 (NO at step S180), the process advances to step S200, and the CPU 11 displays the $v^{th}$ item (as a non-selectable item) at a predetermined position in the third area 43 on the scan-setting screen, and the process advances to step S210.

Figure 6A:
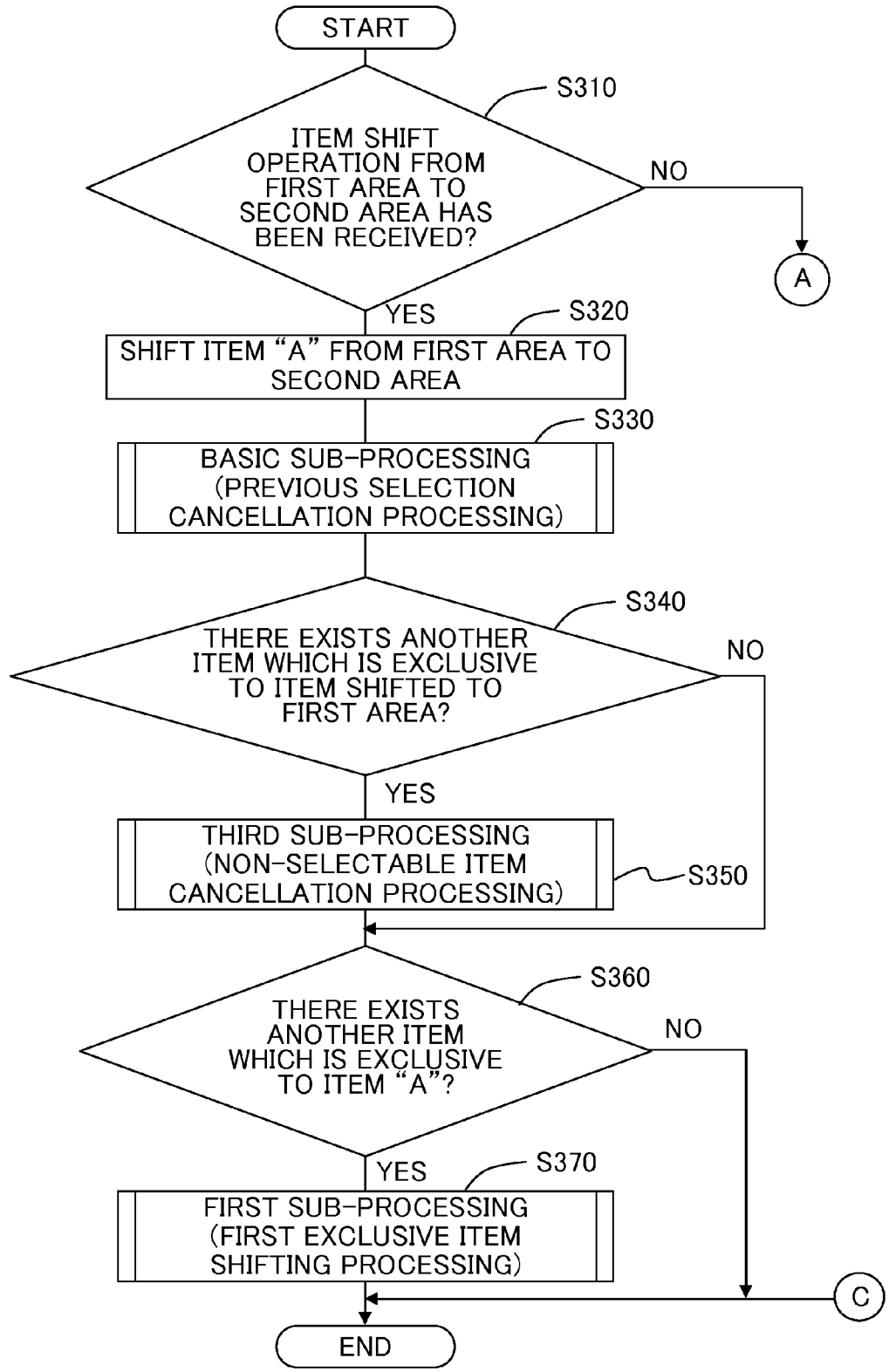
FIGS. 6A, 6B and 6C show a flowchart depicting a setting-operation receiving processing executed by the CPU of the PC.
Figure 6B:
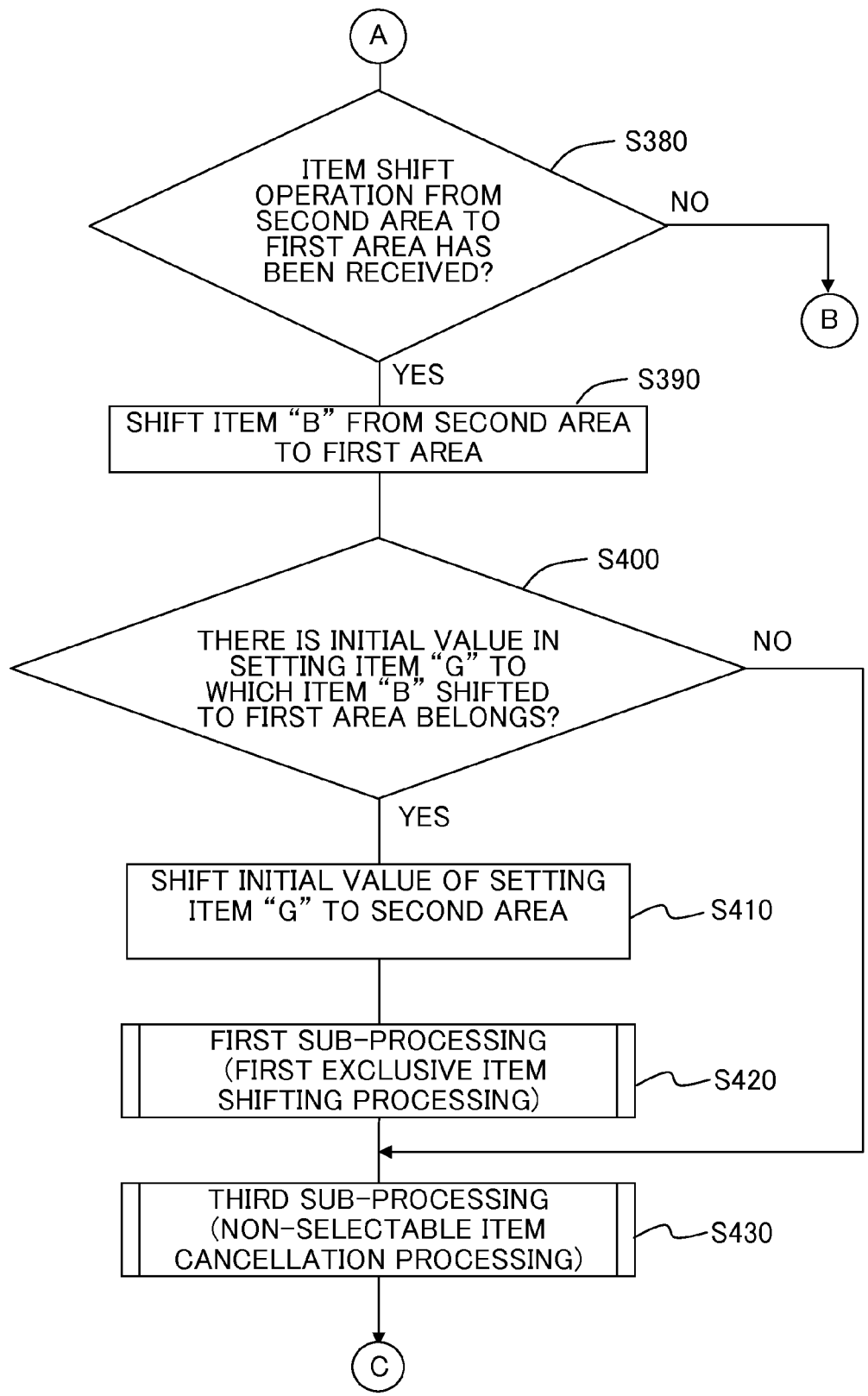
Figure 6C:
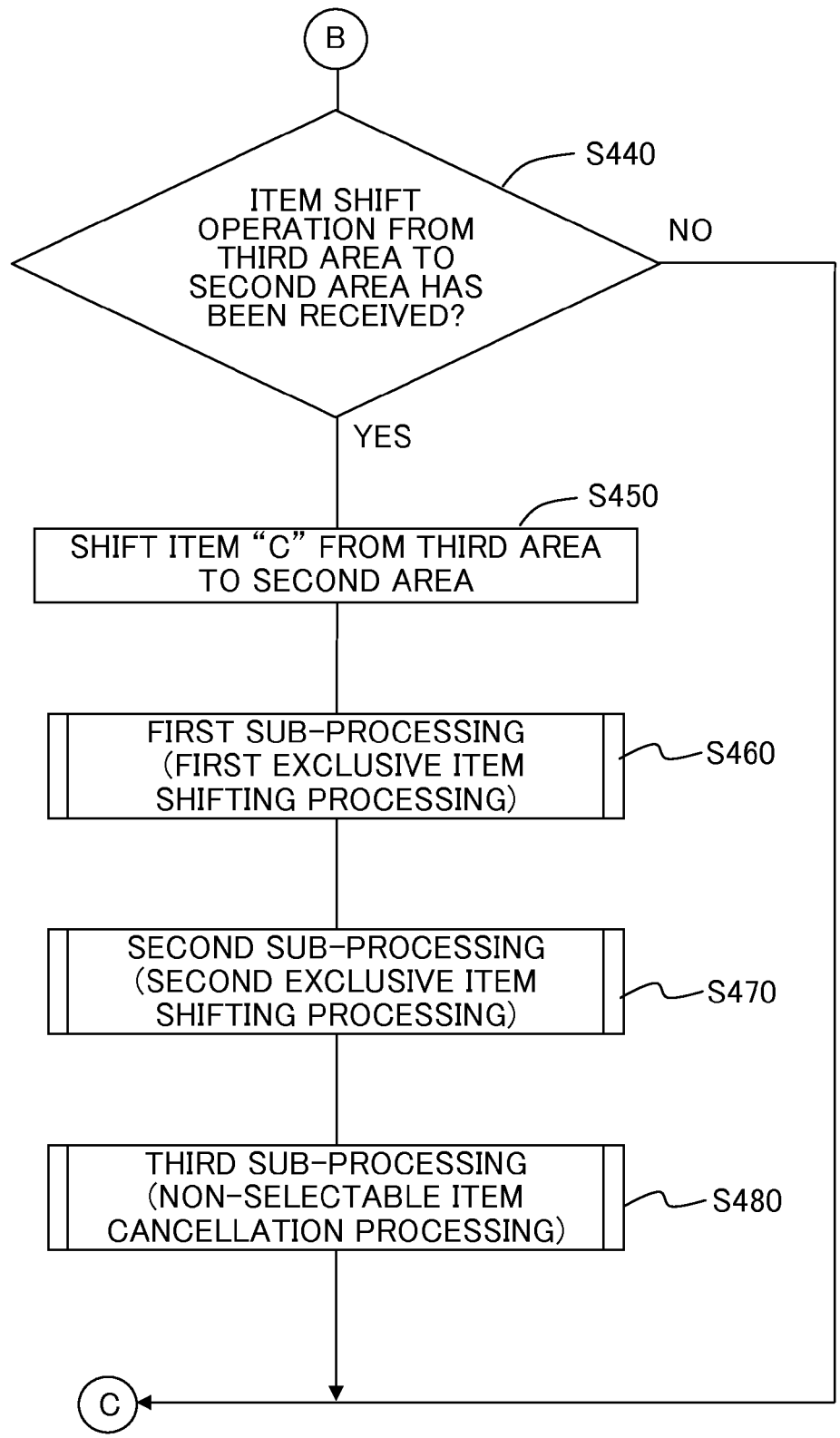

As the CPU 11 displays the initial screen by the setting-screen display processing in FIGS. 5A and 5B, next, the CPU 11 starts a setting-operation receiving processing shown in FIGS. 6A to 6C. The setting-operation receiving processing is executed repeatedly at every predetermined timing after the setting-screen display processing in FIGS. 5A and 5B. As the CPU 11 starts the setting-operation receiving processing, at step S310, the CPU 11 judges whether or not an item shifting operation (shifting operation as exemplified in FIG. 3) from the first area 41 to the second area 42 has been carried out.

In a case that the item shifting operation from the first area 41 to the second area 42 has been carried out (YES at step S310), at step S320, the CPU 11 shifts the item to be shifted (hereinafter, also called as an "item A"), from the first area 41 to the second area 42. Accordingly, the item A becomes the "selected item". Thereafter, the CPU 11 executes a basic-sub processing (previous selection cancellation processing) at step S330. The basic sub-processing is a processing for returning an item which was originally displayed in the second area 42 and which belongs to the setting item same as that of the item A to the first area 41, when the item A is shifted from the first area 41 to the second area 42.

Figure 7:
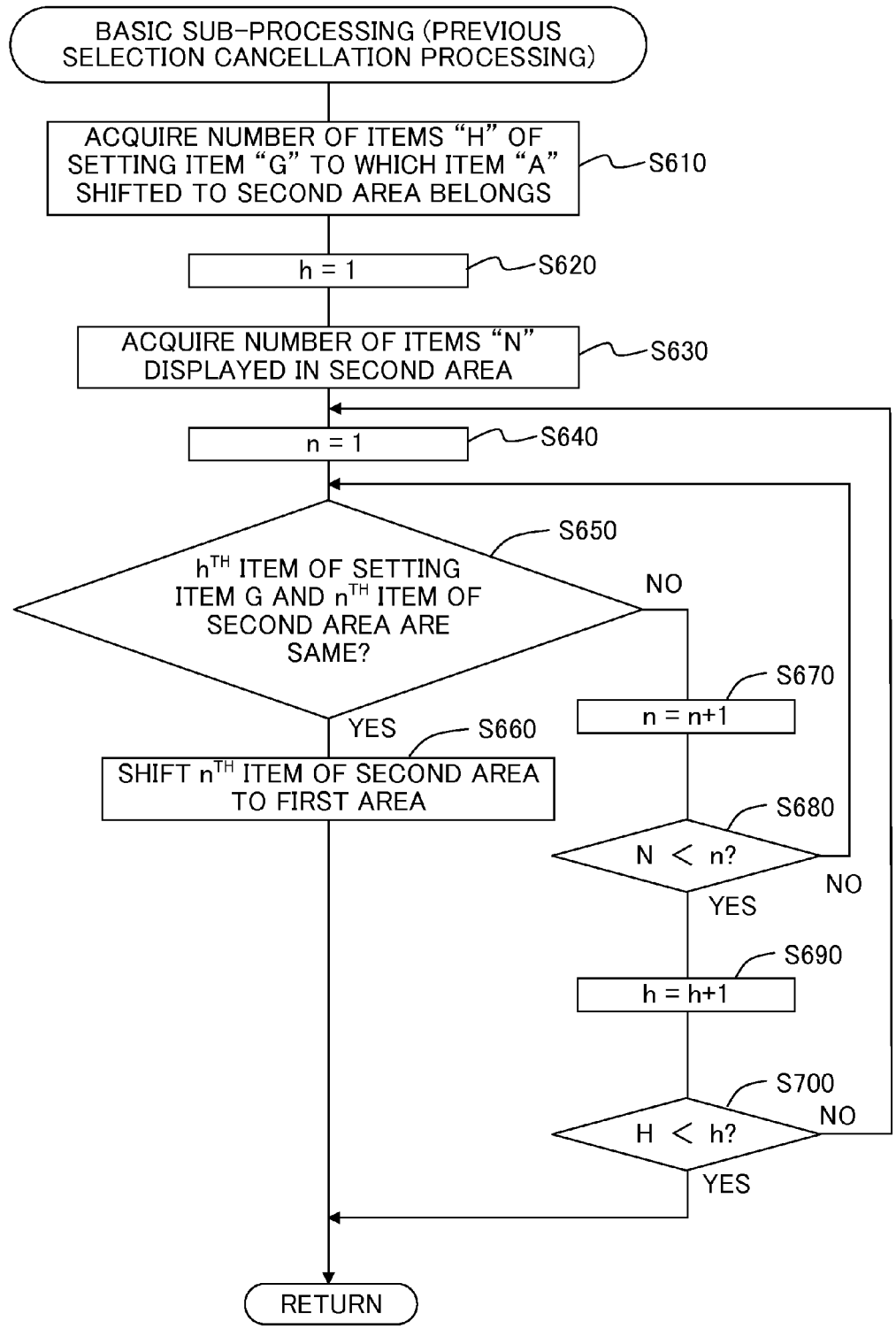
FIG. 7 is flowchart showing a basic sub-processing in FIG. 6A.

Concrete contents of the basic sub-processing are shown in FIG. 7. To start with, at step S610, the CPU 11 acquires the number of items (hereinafter, also called as "the number of belonging items") H of a setting item to which the item A belongs (hereinafter, also called as "belonged setting item G").

As the CPU 11 acquires the number of belonging items H of the belonged setting item G, at step S620, the CPU 11 sets "1" to a belonged setting item element number h. In the embodiment, numbers starting from 1 are assigned to items belonging to each of the setting items. For instance, in a case of the color type, "1" is assigned to "monochrome", "2" is assigned to "gray", and "3" is assigned to "color". The belonged setting item element number h is used to specify a predetermined item in the belonged setting item G.

At step S630, the CPU 11 acquires the number of items N displayed in the second area 42 (hereinafter, also called as the "number of items in the second area"). At step S640, the CPU 11 sets "1" to a second-area element number n. The second-area element number n is a number for specifying one of the items displayed in the second area 42. In the embodiment, numbers 1, 2, 3, . . . are assigned to the items displayed in the second area 42 in order from a top of the second area 42.

At step S650, the CPU 11 makes a judgment of whether or not the $h^{th}$ item (h numbered item) of the belonged setting item G and the $n^{th}$ item displayed in the second area 42 are same. In a case that a judgment is made that the $h^{th}$ item and the $n^{th}$ item are same (YES at step S650), at step S660, the CPU 11 shifts the $n^{th}$ item in the second area 42 to the first area 41. In other words, the CPU 11 terminates the selection state of the $n^{th}$ item, and sets the $n^{th}$ item as a "selectable item". In a case that a judgment is made that the $h^{th}$ item and the $n^{th}$ item are not same (NO at step S650), the CPU 11 increments the second-area element number n by 1 at step S670, and at S680, the CPU 11 makes a judgment of whether or not the number of items N in the second area is greater than the second-area element number n at the current point of time. In a case that the second-area element number n is not greater than the number of items N in the second area (NO at step S680), the process returns to step S650. In a case that the second-area element number n is greater than the number of items N in the second area (YES at step S680), the CPU 11 increments the belonged setting item element number h by 1 at step S690, and step S700, the CPU 11 makes a judgment of whether or not the belonged setting item element number h is greater than the number of belonging items H.

In a case that the belonged setting item element number h is not greater than the number of belonging items H (NO at step S700), the process returns to step S640. In a case that the belonged setting item element number h is greater than the number of belonging items H (YES at step S700), the CPU 11 terminates the basic sub-processing, and the process advances to step S340 (refer to FIG. 6A).

At step S340, the CPU 11 makes a judgment of whether or not there exists another exclusive item which is exclusive to the item which has been shifted from the second area 42 to the first area 41 by the basic sub-processing at step S330. Moreover, in a case that there is no exclusive item (NO at step S340), the process advances to step S360, and in a case that there is another exclusive item (YES at step S340), the process advances to step S350, and the CPU 11 executes a third sub-processing (non-selectable item cancellation processing). The third sub-processing is a processing for returning an item which is displayed in the third area 43 and which is freed from the non-selectable state (an item having no exclusive item, which is exclusive to the item, in the second area 42) to the first area 41.

Figure 10A:
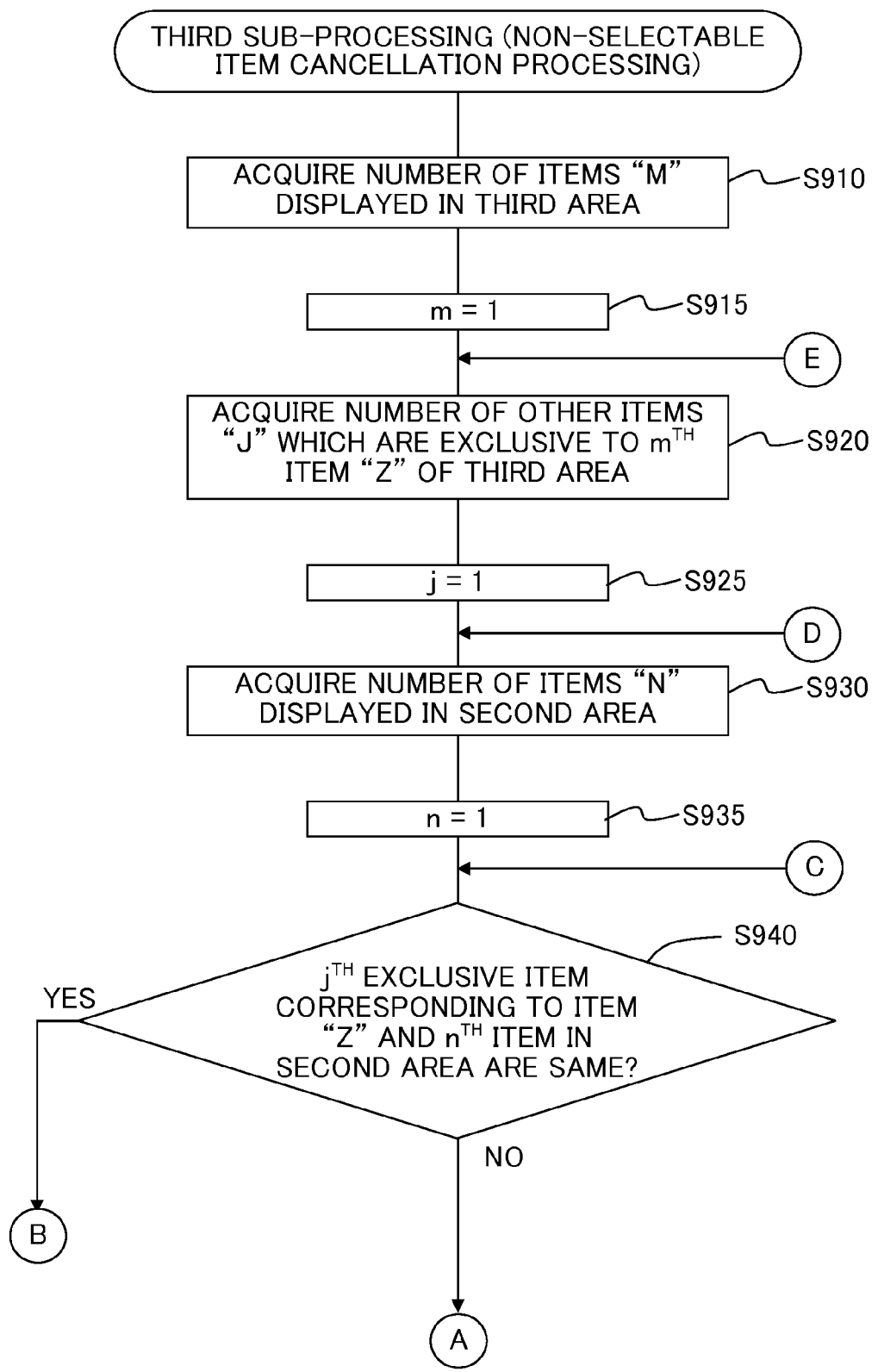
FIGS. 10A and 10B show a flowchart depicting a third sub-processing in FIGS. 6A to 6C.
Figure 10B:
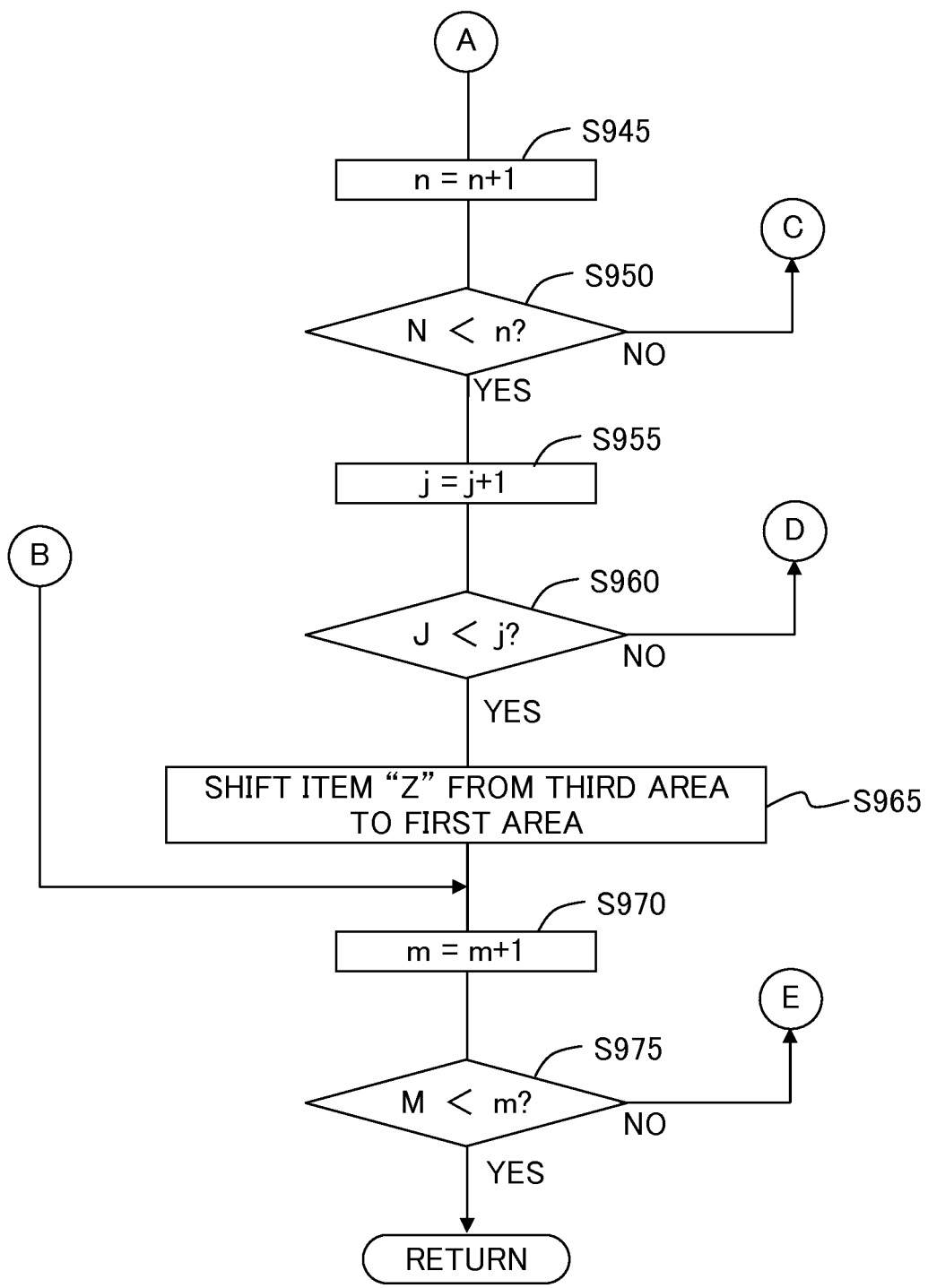

Concrete contents of the third sub-processing are shown in FIGS. 10A and 10B. Firstly, at step S910, the CPU 11 acquires the number of items (hereinafter, also called as "the number of items in the third area") M displayed in the third area 43. At step S915, the CPU 11 sets "1" to a third-area element number m. The third-area element number m is a number for specifying one of the items displayed in the third area 43. In the embodiment, the numbers 1, 2, 3, . . . are assigned to the items displayed in the third area 43 in order from the top of the third area 43.

At step S920, the CPU 11 acquires the number of exclusive items J exclusive to the $m^{th}$ item (hereinafter, also called as "item Z") in the third area 43. At step S925, the CPU 11 sets "1" to an exclusive item element number j. The exclusive item element number j is a number for specifying one of the exclusive items which are exclusive to the item Z. In the embodiment, numbers starting from 1 are assigned to the exclusive items for each item displayed in the third area 43.

At step S930, the CPU 11 acquires the number of items N displayed in the second area 42 (the number of items in the second area). At step S935, the CPU 11 sets "1" to the second-area element number n. At step S940, the CPU 11 makes a judgment of whether or not the $j^{th}$ exclusive item from among the exclusive items with respect to the $m^{th}$ item Z in the third area 43 and the $n^{th}$ item displayed in the second area 42 are same. Here, in a case that a judgment is made that the $j^{th}$ exclusive item and the $n^{th}$ item are same (YES at step S940), the $m^{th}$ item Z is to be maintained as a "non-selectable item". Therefore, at step S970, the third-area element number m is incremented by 1 in order to judge the subsequent $m+1^{th}$ item Z.

At step S975, the CPU 11 makes a judgment of whether or not the third-area element number m is greater than the number of items M displayed in the third area 43 at the current point of time. In a case that the third-area element number m is not greater than the number of items M displayed in the third area 43 (NO at step S975), the process returns to step S920. In a case that the third-area element number m is greater than the number of items M displayed in the third area 43 (YES at step S975), the CPU 11 terminates the third sub-processing, and the process advances to step S360 (refer to FIG. 6A).

In a case that a judgment is made that the $j^{th}$ exclusive item and the $n^{th}$ item are not same (NO at step S940), the CPU 11 increments the second-area element number n by 1 at step S945, and at step S950, the CPU 11 makes a judgment of whether or not the second-area element number n is greater than the number of items N in the second area 42. In a case that the second-area element number n is not greater than the number of items N in the second area 42 (NO at step S950), the process returns to step S940. In a case that the second-area element number n is greater than the number of items N in the second area 42 (YES at step S950), the CPU 11 increments the exclusive item element number j by 1 at step S955, and at step S960, the CPU 11 makes a judgment of whether or not the exclusive item element number j is greater than the number of exclusive items J at the current point of time. In a case that the exclusive item element number j is not greater than the number of exclusive items J (NO at step S960), the process returns to step S930.

In a case that the exclusive item element number j is greater than the number of exclusive items J (YES at step S960), it means that all the exclusive items with respect to the item Z are confirmed not being displayed in the second area 42. Therefore, in this case, at step S965, the CPU 11 shifts that item Z from the third area 43 to the first area 41. In other words, the item Z is released from the non-selectable state and the item Z is set as a "selectable item". After step S965, the process advances to step S970 onward. As the CPU 11 terminates the third sub-processing, the process advances to step S360 (refer to FIG. 6A).

At step S360, the CPU 11 makes a judgment of whether or not there exists another exclusive item which is exclusive to the item A that has been newly selected. Moreover, in a case that there is no exclusive item which is exclusive to the item A (NO at step S360), the CPU 11 terminates the setting-operation receiving processing. In a case that there is another exclusive item which is exclusive to the item A (YES at step S360), the process advances to step S370, and the CPU 11 executes a first sub-processing (first exclusive-item shifting processing). The first sub-processing is a processing for shifting an item which is exclusive to the item A newly shifted to the second area 42, to the third area 43 as an "non-selectable item", in a case that the item exclusive to the item A is displayed in the first area 41.

Figure 8A:
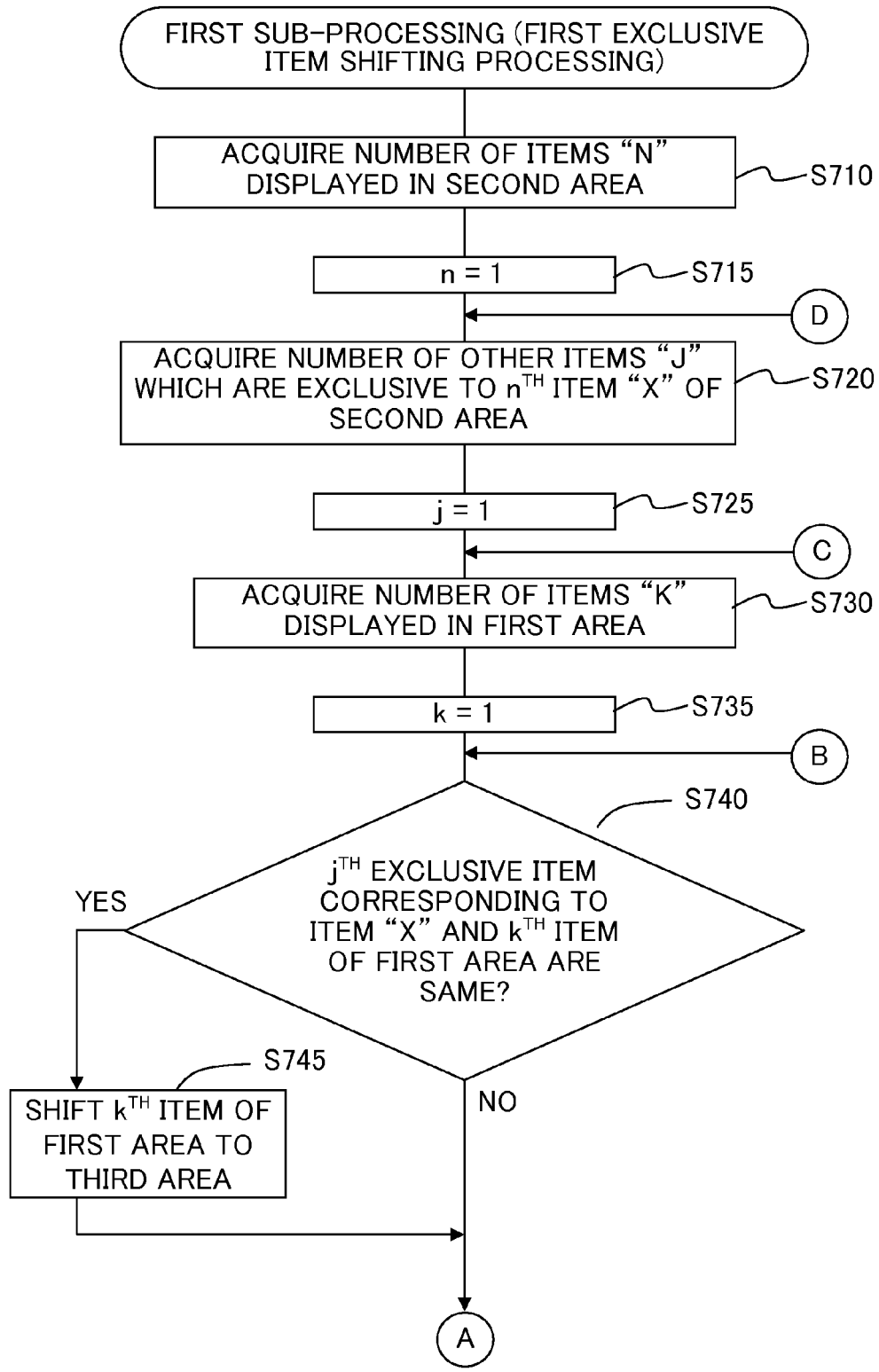
FIGS. 8A and 8B show a flowchart depicting a first sub-processing in FIGS. 6A to 6C.
Figure 8B:
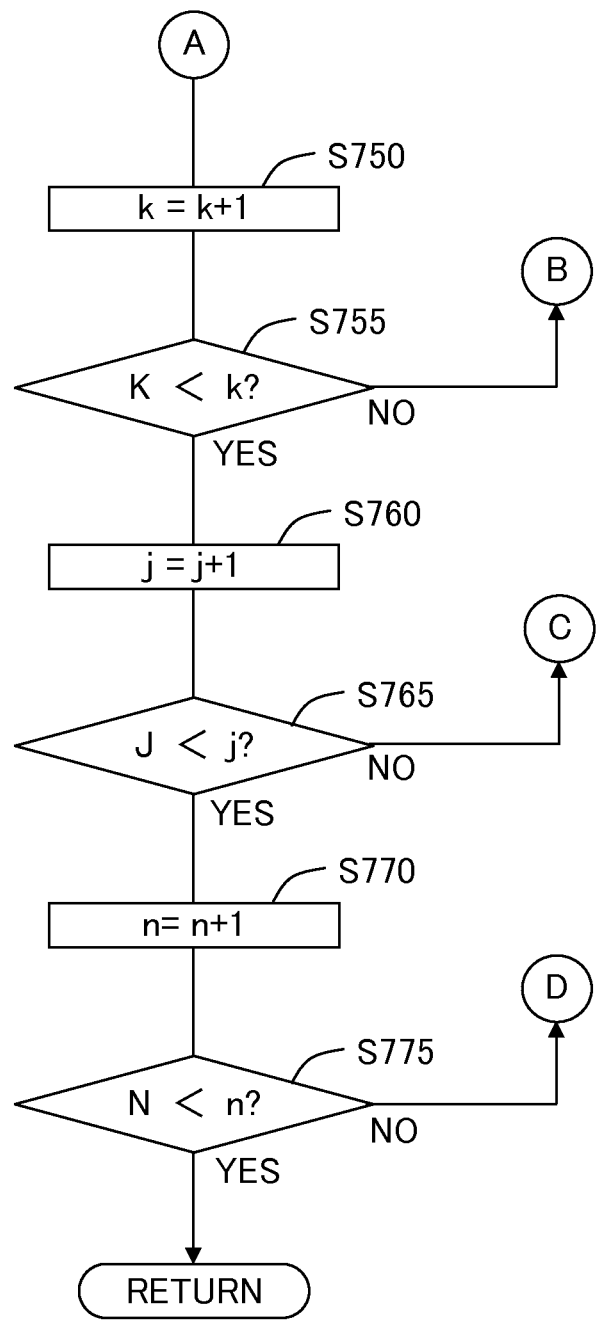

Concrete contents of the first sub-processing are shown in FIGS. 8A and 8B. Firstly, at step S710, the CPU 11 acquires the number of items N displayed in the second area 42 (the number of items in the second area). At step S715, the CPU 11 sets "1" to the second-area element number n. At step S720, the CPU 11 acquires the number of exclusive items J which are exclusive to the $n^{th}$ item (hereinafter, also called as "item X") in the second area 42. At step S725, the CPU 11 sets "1" to the exclusive item element number j.

At step S730, the CPU 11 acquires the number of items K displayed in the first area 41 (hereinafter, also called as "the number of items K in the first area"). At step S735, the CPU 11 sets "1" to a first-area element number k. The first-area element number k is a number for specifying one of the items normally displayed in the first area 41. In the embodiment, numbers 1, 2, 3, . . . are assigned to the items normally displayed in the first area 41 in order from the top (in order from left for a plurality of items in a same setting item) of the first area 41.

At step S740, the CPU 11 makes a judgment of whether or not the $j^{th}$ exclusive item from among the exclusive items with respect to the $n^{th}$ item X in the second area 42 and the $k^{th}$ item displayed in the first area 41 are same. In a case that the $j^{th}$ exclusive item and the $k^{th}$ item are same (YES at step S740), the CPU 11 shifts the $k^{th}$ item in the first area 41 to the third area 43 at step S745. In other words, the CPU 11 sets the $k^{th}$ item as a "non-selectable item". In a case that a judgment is made that the $j^{th}$ exclusive item and the $k^{th}$ item are not same (NO at step S740), the process advances to step S750.

At step S750, the CPU 11 increments the first-area element number k by 1. At step S755, the CPU 11 makes a judgment of whether or not the first-area element number k is greater than the number of items K in the first area at the current point of time. In a case that the first-area element number k is not greater than the number of items K in the first area (NO at step S755), the process returns to step S740. In a case that the first-area element number k is greater than the number of items K in the first area (YES at step S755), the CPU 11 increments the exclusive item element number j by 1 at step S760, and at step S765, the CPU 11 makes a judgment of whether or not the exclusive item element number j is greater than the number of exclusive items J at the current point of time. In a case that the exclusive item element number j is not greater than the number of exclusive items J (NO at step S765), the process returns to step S730. In a case that the exclusive item element number j is greater than the number of exclusive items J (YES at step S765), the CPU 11 increments the second-area element number n by 1 at step S770, and at step S775, the CPU 11 makes a judgment of whether or not the second-area element number n is greater than the number of items N in the second area at the current point of time. In a case that the second-area element number n is not greater than the number of items N in the second area (NO at step S775), the process returns to step S720. In a case that the second-area element number n is greater than the number of items N in the second area (YES at step S775), the CPU 11 terminates the first sub-processing.

At step S310 of the setting-operation receiving processing in FIG. 6A, in a case that the item shifting operation from the first area 41 to the second area 42 has not been carried out (NO at step S310), at step S380, the CPU 11 makes a judgment of whether or not an item shifting operation from the second area 42 to the first area 41 (an operation as exemplified in FIG. 4A) has been carried out by the user. In a case that the item shifting operation from the second area 42 to the first area 41 has been carried out (YES at step S380), the process advances to step S390, and the CPU 11 shifts the item to be shifted (hereinafter, also called as an "item B") from the second area 42 to the first area 41. In other words, the CPU 11 returns the item B, which had been displayed as a "selected item" in the second area 42, as a "selectable item" to display normally.

Thereafter, at step S400, the CPU 11 makes a judgment of whether or not there is an initial-value setting item in the setting item to which the item B belongs (belonged setting item G). The initial-value setting item is an item to which the second area is set as an initial-display position in the initial-display area presetting table shown in FIG. 2C. In a case that at step S400, a judgment is made that there is no initial-value setting item in the belonged setting item G to which the item B belongs (NO at step S400), the process advances to step S430, and in a case that a judgment is made that there is an initial-value setting item in the belonged setting item G (YES at step S400), at step S410, the CPU 11 shifts the initial-value setting item of the setting item G to the second area 42 as the "selected item". In other words, the CPU 11 replaces the item B with the initial-value setting item and displays the initial-value setting item in the second area 42.

The item to be displayed in the second area 42 instead of item B is not restricted to the initial-value setting item. For instance, an item (an item belonging to the same setting item G) which had been displayed in the second area 42 immediately before the item B was displayed in the second area 42 may be displayed once again in the second area 42, or in a case that the previous setting contents are saved in the setting file, an item which had been displayed in the second area 42 when the previous operation was terminated may be displayed in the second area 42.

After the processing at step S410, at step S420, the CPU 11 executes the first sub-processing (first exclusive-item shifting processing). The first sub-processing is a processing shown in FIGS. 8A and 8B, and concrete contents of the first sub-processing are as already been mentioned. As a result of shifting the item from the first area 41 to the second area 42 by the processing at step S410, there is a possibility that the item that has been shifted to the second area 42 and another item in the first area 41 that can be selected become mutually exclusive. In that case, it is necessary to shift the exclusive item from the first area 41 to the third area 43 as an "non-selectable item". For realizing the shifting of the exclusive item, the CPU 11 executes the first sub-processing at step S420.

After execution of the first sub-processing at step S420, at step S430, the CPU 11 executes the third sub-processing (non-selectable item cancellation processing). The third sub-processing is a processing shown in FIGS. 10A and 10B, and concrete contents thereof are as already been mentioned. As a result of shifting the item B from the second area 42 to the first area 41 by the processing at step S390, there is a possibility that there is an item which is displayed in the third area and which is freed from the non-selectable state (an item, having no exclusive item, which is exclusive to the item, in the second area 42). In such case, it is necessary to return the item displayed in the third area 43 to the first area 41 as a "selectable item". For realizing the return of the item, the CPU 11 executes the third sub-processing at step S430.

At step S380, in a case that the item shifting operation from the second area 42 to the first area 41 has not been carried out (NO at step S380), at step S440, the CPU 11 makes a judgment of whether or not an item shifting operation from the third area 43 to the second area 42 (shifting operation as exemplified in FIG. 4B) has been carried out.

In a case that the item shifting operation from the third area 43 to the second area 42 has not been carried out (NO at step S440); the CPU 11 terminates the setting-operation receiving processing. In a case that the item shifting operation from the third area 43 to the second area 42 has been carried out (YES at step S440), the process advances to step S450, and the CPU 11 shifts the item to be shifted (hereinafter, also called as an "item C") from the third area 43 to the second area 42 as the "selected item".

Moreover, at step S460, the CPU 11 executes the first sub-processing (first exclusive-item shifting processing). The first sub-processing is a processing shown in FIGS. 8A and 8B, and concrete contents thereof are as already been mentioned. As a result of shifting the item C from the third area 43 to the second area 42 by the processing at step S450, there is a possibility that the item C and an item which is displayed in the first area 41 as the selectable item become mutually exclusive. In such case, it is necessary to shift the item which is displayed in the first area 41 and which is exclusive to the item C to the third area 43 as a "non-selectable item". For realizing the shifting of the item from the first area 41 to the third area 43, the CPU 11 executes the first sub-processing at step S460.

Figure 9:
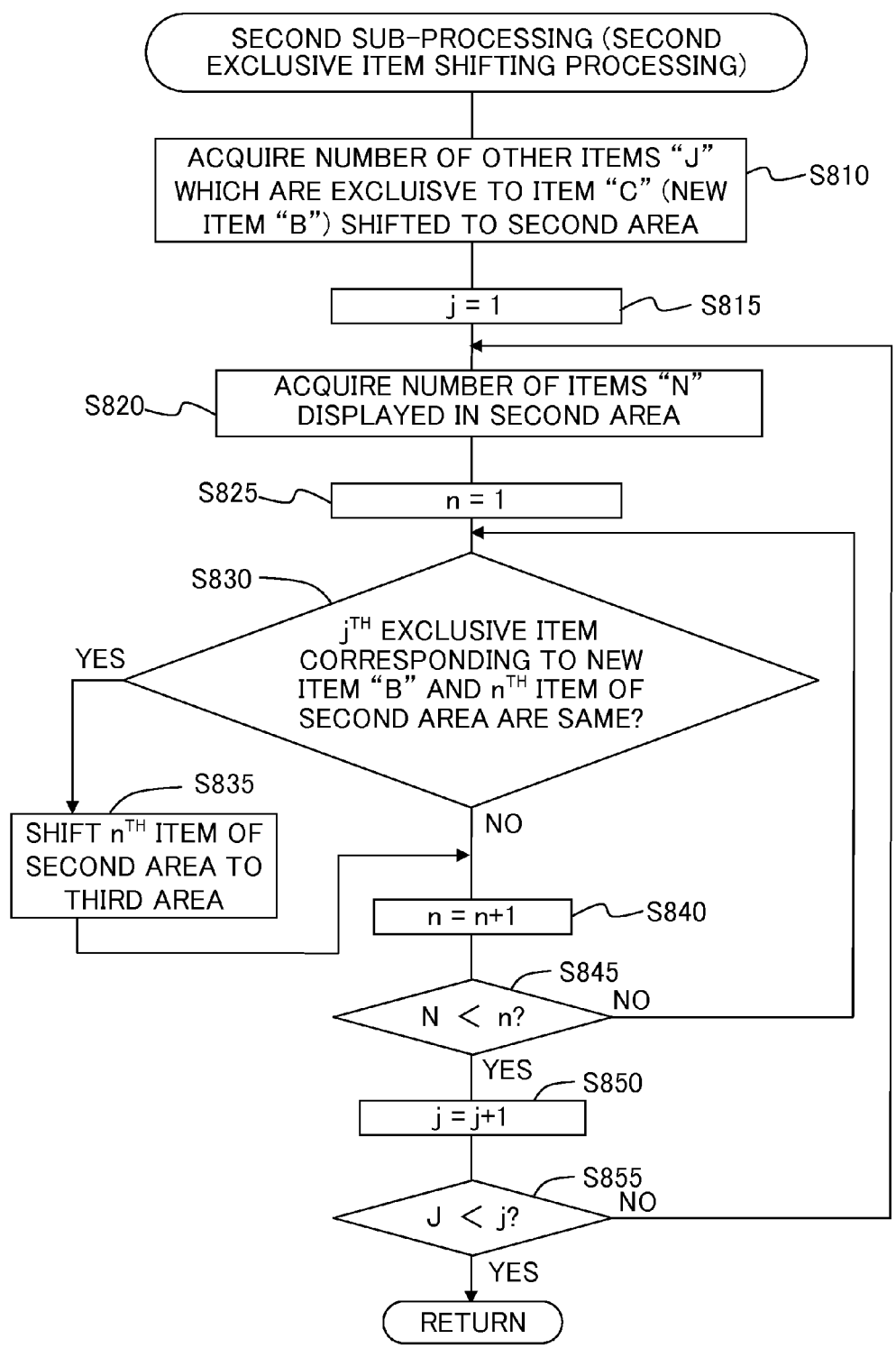
FIG. 9 is a flowchart showing a second sub-processing in FIG. 6C.

After execution of the first sub-processing at step s460, at step S470, the CPU 11 executes a second sub-processing (second exclusive-item shifting processing). The second sub-processing is a processing for shifting an item which is exclusive to the item C shifted to the second area 42 to the third area 43 as a "non-selectable item", in a case that the item exclusive to the item C is in the same second area 42. Concrete contents of the second sub-processing are shown in FIG. 9. Firstly, at step S810, the CPU 11 acquires the number of exclusive items J which are exclusive to the item C shifted from the third area 43 to the second area 42 (hereinafter, also called as a "new item B"). At step S815, the CPU 11 sets "1" to the exclusive item element number j. At step S820, the CPU 11 acquires the number of items N displayed in the second area 42. At step S825, the CPU 11 sets "1" to the second-area element number n.

At step S830, the CPU 11 makes a judgment of whether or not the $j^{th}$ exclusive item with respect to the new item B, and the $n^{th}$ item displayed in the second area 42 are same. Here, in a case that a judgment is made that the $j^{th}$ exclusive item and the $n^{th}$ item are same (YES at step S830), at step S835, the CPU 11 shifts the $n^{th}$ item in the second area 42 to the third area 43 as a "non-selectable item". After the processing at step S835, or in a case that a judgment is made that the $j^{th}$ exclusive item and the $n^{th}$ item are not same (NO at step S830), the process advances to step S840.

At step S840, the CPU 11 increments the second-area element number n by 1, and at step S845, the CPU 11 makes a judgment of whether or not the second-area element number n is greater than the number of items N in the second area 42 at the current point of time. In a case that the second-area element number n is not greater than the number of items N in the second area 42 (NO at step S845), the process returns to step S830. In a case that the second-area element number n is greater than the number of items N in the second area 42 (YES at step S845), the CPU 11 increments the exclusive-item element number j by 1 at step S850, and at step S855, the CPU 11 makes a judgment of whether or not the exclusive-item element number j is greater than the number of exclusive items J at the current point of time. In a case that the exclusive-item element number j is not greater than the number of exclusive items J (NO at step S855), the process returns to step S820. In a case that the exclusive-item element number j is greater than the number of exclusive items J (YES at step S855), the CPU 11 terminates the second sub-processing, and the process shifts to the third sub-processing (non-selectable item cancellation processing) of step S480 (refer to FIG. 6C).

The third sub-processing of step S480 is a processing shown in FIGS. 10A and 10B, and concrete contents thereof are as already been mentioned. As a result of shifting the item in the second area 42 to the third area 43 by the second sub-processing at step S470, there is a possibility that these is an item which had been displayed in the third area 43 and which is exclusive to the item shifted to the third area 43 (an item having no exclusive item displayed in the second area 42). In that case, it is necessary to return the item in the third area 43 having no exclusive item displayed in the second area 42, to the first area 41 as a "selectable item". For realizing the return of the item, the CPU 11 executes the third sub-processing at step S480. As the CPU 11 finishes the third sub-processing, the setting-operation receiving processing is terminated.

According to the information processing system 1 described heretofore, as the user selects a desired item (parameter) from the first area 41, another item which is exclusive to the selected item by the user is displayed in the third area 43 as the "non-selectable setting item". Therefore, in a case that there is another item which is exclusive to the selected item, the user is able to know easily and specifically that there is an item which is exclusive to the selected item. Therefore, the usability at the time of selecting the item by the user is improved.

Moreover, as it has been mentioned above, shifting of the item from the second area 42 to the first area 41, and shifting of the item from the third area 43 to the second area 42 are also possible. Besides, in a case that there is a new item which cannot be selected by such shifting, that item is shifted to the third area 43. Conversely, in a case that the item which had been displayed in the third area 43 is freed from the non-selectable state, the item is shifted to the first area 41. Accordingly, every time the operation of shifting the item is carried out, the user is capable of knowing easily visually, as to what item has been selected, what item cannot be selected, and what item can be selected newly at the current point of time.

[Modified Embodiments]

Embodiments of the present invention are not restricted to the embodiment described above, and it is needless to mention that it is possible to have various embodiments within the technical scope of the present invention. For example, the initial screen (default state) shown in FIG. 2A is merely an example, and it can be determined appropriately as to which item in the initial screen is to be set as a "selected item". Moreover, each setting item and each item (parameter) shown in FIG. 2 are merely examples.

Moreover, the exclusive-relationship table shown in FIG. 2B is merely an example, and it can be determined appropriately as to which items are to be mutually exclusive according to constraints of software and hardware.

Furthermore, in the embodiment described above, an example of mouse operation has been cited as a user operation at the time of shifting an item on the scan setting screen. However, the mouse operation is merely an example, and an arrangement may be made such that shifting by a keyboard input is possible, or shifting by drag-and-drop operation on a touch panel is possible. Moreover, an arrangement may be made such that an item is shifted by an operation other than the drag-and-drop operation. Furthermore, an arrangement may be made such that the scan-setting screen is displayed on the operation and display section 24 of the MFP 3, and selection of item is carried out similarly as it has been described above.

What is claimed is:

1. A display control apparatus configured to control a display to display contents in a first display area, a second display area, and a third display area on the display, the display control apparatus comprising:
   a control section for controlling the display configured to:
     display at least one setting value in the first display area for each of a plurality of setting items;
     receive a user's selection of a setting value;
     display the selected setting value in the second display area in response to the user's selection;
     determine if an exclusive setting value is displayed in the first display area, wherein the exclusive setting value belongs to a setting item different from the setting item associated with the user's selection, and further wherein the exclusive setting value is not selectable by the user; and
     display the exclusive setting value in the third display area as a non-selectable setting value when determined that there is the exclusive setting value;
   wherein the control section is further configured to:
     receive a cancellation command for cancelling the user's selection of the selected setting value displayed in the second display area;
     cancel the display of the selected setting value in the second display area and display the selected setting value in the first display area in response to receipt of the cancellation command;
     determine, in response to receipt of the cancellation command, whether there is any non-selectable setting value that is displayed in the third display area and is adequate to be selected with any setting value displayed in the second display area;
     cancel the display of the non-selectable setting value in the third display area; and
     display the non-selectable setting value in the first display area, when it is determined that there is the non-selectable setting value.

2. The display control apparatus according to claim 1, wherein the control section is further configured to:
   receive a selection command for selecting the non-selectable setting value displayed in the third display area as an effective setting value;
   display the selected non-selectable setting value in the second display area as the effective setting value in response to receipt of the selection command;
   determine whether there is another exclusive setting value, that is displayed in one of the first display area and the second display area and is inadequate to be selected with the selected non-selectable setting value; and
   display the another exclusive setting value in the third display area as a non-selectable setting value when determined that there is the another exclusive setting value in one of the first display area and the second display area.

3. The display control apparatus according to claim 2, wherein the control section is further configured to:
   determine whether there is another non-selectable setting value, that is displayed in the third display area and is adequate to be selected with any setting values displayed in the second display area, when the another exclusive setting value is displayed in the third display area; and
   display the another non-selectable setting value in the first display area when determined that there is the another non-selectable setting value.

4. The display control apparatus according to claim 1, further comprising:
   a storage section storing exclusive-relationship information which indicates at least one combination of setting values, wherein the at least one combination includes one setting value belonging to one setting item and another setting value belonging to another setting item, and the one setting value is inadequate to be selected with the another setting value, wherein the control section is configured to determine, based on the exclusive-relationship information stored in the storage section, whether there is the exclusive setting value in the setting values, the exclusive setting value being inadequate to be selected with the selected setting value.

5. A display control method used in a display control apparatus configured to control a display to display contents in a first display area, a second display area, and a third display area on the display, the display control method comprising:
   displaying at least one setting value in the first display area for each of a plurality of setting items;
   receiving a user's selection of a setting value;
   displaying the selected setting value in the second display area in response to the user's selection;
   determining if an exclusive setting value is displayed in the first display area, wherein the exclusive setting value belongs to a setting item different from the setting item associated with the user's selection, and further wherein the exclusive setting value is not selectable by the user; and
   displaying the exclusive setting value in the third display area as a non-selectable setting value when determined that there is the exclusive setting value;
   receiving a cancellation command for cancelling the user's selection of the selected setting value displayed in the second display area;
   cancelling the display of the selected setting value in the second display area and displaying the selected setting value in the first display area in response to receipt of the cancellation command;
   determining, in response to receipt of the cancellation command, whether there is any non-selectable setting value that is displayed in the third display area and is adequate to be selected with any setting value displayed in the second display area;

cancelling the display of the non-selectable setting value in the third display area and displaying the non-selectable setting value in the first display area, when it is determined that there is the non-selectable setting value.

6. A non-transitory computer-readable storage medium storing computer-executable instructions that, when executed by a processor, cause a display control apparatus configured to control a display to display contents in a first display area, a second display area, and a third display area on the display, to:

display at least one setting value in the first display area for each of a plurality of setting items;

receive a user's selection of a setting value;

display the selected setting value in the second display area, in response to the user's selection;

determine if an exclusive setting value is displayed in the first display area, wherein the exclusive setting value belongs to a setting item different from the setting item associated with the user's selection, and further wherein the exclusive setting value is not selectable by the user; and display the exclusive setting value in the third display area as a non-selectable setting value when determined that there is the exclusive setting value;

receive a cancellation command for cancelling the user's selection of the selected setting value displayed in the second display area;

cancel the display of the selected setting value in the second display area and display the selected setting value in the first display area in response to receipt of the cancellation command;

determine, in response to receipt of the cancellation command, whether there is any non-selectable setting value that is displayed in the third display area and is adequate to be selected with any setting value displayed in the second display area;

cancel the display of the non-selectable setting value in the third display area; and display the non-selectable setting value in the first display area, when it is determined that there is the non-selectable setting value.

\* \* \* \* \*